US012597863B2

(12) United States Patent
Dahaki et al.

(10) Patent No.: US 12,597,863 B2
(45) Date of Patent: Apr. 7, 2026

(54) ISOLATED BUCK-BOOST TOPOLOGIES AND CONTROL THEREOF

(71) Applicant: power switching llc, Torrance, CA (US)

(72) Inventors: Alen Dahaki, Gardena, CA (US); Farzad Ahmadkhanlou, Torrance, CA (US); Reza Sarhadi Nia, Torrance, CA (US)

(73) Assignee: Power Switching LLC, Torrance, CA (US)

( * ) Notice: Subject to any disclaimer, the term of this patent is extended or adjusted under 35 U.S.C. 154(b) by 0 days.

(21) Appl. No.: 18/612,479

(22) PCT Filed: Mar. 21, 2024

(86) PCT No.: PCT/US2024/020915
§ 371 (c)(1),
(2) Date: Mar. 21, 2024

(87) PCT Pub. No.: WO2024/242747
PCT Pub. Date: Nov. 28, 2024

(65) Prior Publication Data
US 2026/0005610 A1      Jan. 1, 2026

Related U.S. Application Data

(60) Provisional application No. 63/453,654, filed on Mar. 21, 2023.

(51) Int. Cl.
*H02M 3/335*      (2006.01)
*H02M 1/00*      (2006.01)
*H02M 1/42*      (2007.01)

(52) U.S. Cl.
CPC ..... *H02M 3/33523* (2013.01); *H02M 1/0009* (2021.05); *H02M 1/4208* (2013.01); *H02M 3/33592* (2013.01)

(58) Field of Classification Search
CPC ........... H02M 3/33523; H02M 1/0009; H02M 1/4208; H02M 3/33592
See application file for complete search history.

(56) References Cited

U.S. PATENT DOCUMENTS 7,064,694 B1 * 6/2006 Male ...................... H04N 25/78
                                                                        341/155
2007/0210782 A1 * 9/2007 Prexl ................... H02M 3/1582
                                                                        323/288

(Continued)

*Primary Examiner* — Rafael O De Leon Domenech

(57) ABSTRACT

A circuit includes a first stage that operates in a buck, boost, or combination of buck and boost topology. The first stage includes an input side that receives an input signal and has a plurality of switches, and an output side that applies an output signal. The first stage includes a voltage transformer having a first winding coupled to the input side and a second winding coupled to the output side, and a rectifier coupled to the second winding. A fourth stage generates a first voltage error signal based on the output signal, and a third stage generates two voltage error signals based on the first voltage error signal. A second stage receives the two voltage error signals and generates a plurality of PWM signals based on the voltage error signals, the PWM signals being used to control the switches in the first stage.

20 Claims, 16 Drawing Sheets

(56)         References Cited

U.S. PATENT DOCUMENTS

2014/0111016 A1*   4/2014   He  .......................  H02M 7/487
                                                  307/82
2015/0214934 A1*   7/2015   Luan  .......................  H03K 4/50
                                                  331/111
2016/0154051 A1*   6/2016   Watson  ..............  G01R 31/1272
                                                  324/552
2017/0085183 A1*   3/2017   Notsch  ....................  H02M 1/44
2021/0336542 A1*   10/2021   Li  .......................  H02M 3/1582

* cited by examiner

Generic Input Voltage and Current (AC-DC Converters)

ISOLATED BUCK-BOOST TOPOLOGIES AND CONTROL THEREOF

CROSS-REFERENCE TO RELATED APPLICATIONS

This application claims the benefit and priority of U.S. Provisional Application No. 63/453,654, titled Isolated Buck-Boost Topologies and Control Thereof and filed on Mar. 21, 2023, the entire contents of which is hereby incorporated by reference in its entirety.

BACKGROUND

1. Field

The present disclosure relates to circuit topologies used in power switching topologies and, more particularly, to circuit topologies that increase switching efficiency and provide additional advantages over conventional power switching topologies.

2. Description of the Related Art

Power converters of differing topologies are used in many electronic devices today. These converters may include alternating current (AC) to direct current (DC) converters and DC-DC converters. More and more mechanical and electrical devices are being designed to be driven with electricity rather than fossil fuels, meaning that more and more electrical devices are in use. These mechanical and electrical devices that may be driven with electricity include electric vehicles (EV), electric mowers and blowers, and the like. The growth in quantity of these devices increases demand from power grids. Most of these devices utilize power converters of various types during regular operation.

All existing power converters have some inherent limitations and inefficiencies. Examples of these limited and inefficient power converters include full-bridge zero voltage switches (ZVS) and resonance systems. Many of these converters and related systems are inflexible when it comes to design choices and may not function with a relatively large voltage range, making redesigns necessary for any substantial changes to the converters. Also, many converters are relatively inefficient, resulting in significant power waste during operation of the switches. Reducing power consumption and waste provides multiple advantages, such as reducing a drain on the electrical grid (thus potentially reducing greenhouse gasses and allowing more devices to draw power from the grid simultaneously) and reducing the cost of operating these devices. In addition to these limitations, many converters may be complex with many parts, making any converters relatively complex to design and expensive to manufacture.

Thus, there is a need in the art for systems and methods for improved switching topologies for use in power converters.

SUMMARY

Described herein is a circuit that includes a first stage designed to function as at least one of a buck topology, a boost topology, or a combination of the buck topology and the boost topology. The first stage includes an input side configured to be coupled to an input signal and having a plurality of switches. The first stage further includes an output side configured to be coupled to a load and to apply an output signal to the load. The first stage further includes a voltage transformer having a first winding coupled to the input side and a second winding coupled to the output side. The first stage further includes a rectifier designed to be coupled between the second winding of the voltage transformer and the load. The circuit further includes a fourth stage designed to receive the output signal and to generate a first voltage error signal. The circuit further includes a third stage designed to receive the first voltage error signal and to generate a second voltage error signal and a third voltage error signal based on the first voltage error signal. The circuit also includes a second stage designed to receive the second voltage error signal and the third voltage error signal and to generate a plurality of pulse width modulation (PWM) signals based on the second voltage error signal and the third voltage error signal, the plurality of PWM signals being used to control the plurality of switches in the first stage.

In any of the foregoing embodiments, the second winding of the voltage transformer has a first end connected to the rectifier and a second end coupled to the rectifier with a current transformer coupled between the second end and the rectifier, the output of the rectifier being configured to be coupled to the load.

In any of the foregoing embodiments, the current transformer has a first winding coupled to the second end of the voltage transformer and a second winding, the second winding having a first end that corresponds to a second current feedback signal and a second end that corresponds to a fourth current feedback signal.

In any of the foregoing embodiments, the input signal is received from a first input terminal and a second input terminal, and the plurality of switches includes: a first switch located between the first input terminal and the first winding of the voltage transformer; a second switch located between the second input terminal and the first winding of the voltage transformer with a first inductor coupled between the second switch and the first winding; a third switch located between the first input terminal and the first winding of the voltage transformer; and a fourth switch located between the second input terminal and the first winding of the voltage transformer with a second inductor coupled between the fourth switch and the first winding.

In any of the foregoing embodiments, the input signal is configured to be an alternating current (AC) signal, the output signal is configured to be a direct current (DC) signal, and the first stage includes an auxiliary rectifier configured to rectify the AC input signal between the input signal and the plurality of switches.

In any of the foregoing embodiments, the input signal is configured to be a direct current (DC) signal, and the output signal is also configured to be a DC signal.

In any of the foregoing embodiments, the fourth stage includes a voltage loop configured to receive the output signal and a reference signal and to output the first voltage error signal.

In any of the foregoing embodiments, the input signal is configured to be an alternating current (AC) signal, the output signal is configured to be a direct current (DC) signal, and the fourth stage further includes an auxiliary PWM block configured to receive an output of the voltage loop, a multiplier configured to multiply the output of the voltage loop by a voltage value of the input signal, and an AC input current loop configured to receive an output of the multiplier and a current value of the input signal and to generate an output signal to function as the first voltage error signal.

In any of the foregoing embodiments, the input signal is configured to be a direct current (DC) signal, the output signal is also configured to be a DC signal, and the fourth stage is configured to output the first voltage error signal from the voltage loop as the first voltage error signal received by the third stage.

In any of the foregoing embodiments, the third stage is further configured to receive a first current feedback signal corresponding to a current value of the first switch and a third current feedback signal corresponding to a current value of the third switch, wherein the second voltage error signal is based on a comparison of the first voltage error signal and the first current feedback signal, and wherein the third voltage error signal is based on a comparison of the first voltage error signal and the third current feedback signal.

In any of the foregoing embodiments, the second stage further includes: a first comparator configured to compare the second voltage error signal with a first ramp signal and to output results of the comparison as a signal PWM A; a second comparator configured to compare the second voltage error signal with a second ramp signal and to output results of the comparison as a signal PWM B; a third comparator configured to compare the third voltage error signal with a third ramp signal and to output results of the comparison as a signal PWM C; and a fourth comparator configured to compare the third voltage error signal with a fourth ramp signal and to output results of the comparison as a signal PWM D.

In any of the foregoing embodiments, the second stage further includes a controller configured to output the first ramp signal, the second ramp signal, the third ramp signal, and the fourth ramp signal, and to output a first switch current detection signal corresponding to current flowing through the first switch in the first stage and a third switch current detection signal corresponding to current flowing through the third switch in the first stage.

In any of the foregoing embodiments: the plurality of PWM signals generated by the second stage include a first PWM signal to control a first switch of the plurality of switches in the first stage, a second PWM signal to control a second switch of the plurality of switches in the first stage, a third PWM signal to control a third switch of the plurality of switches in the first stage, and a fourth PWM signal to control a fourth switch of the plurality of switches in the first stage; and the second stage further includes a controller configured to generate the first PWM signal based on the signal PWM A, to generate the second PWM signal based on the signal PWM B, to generate the third PWM signal based on the signal PWM C, and to generate the fourth PWM signal based on the signal PWM D.

Also disclosed is a system. The system includes a first stage configured to function as at least one of a buck topology, a boost topology, or a combination of the buck topology and the boost topology, the first stage coupled to an input line and an output line configured to be coupled to a load. The first stage includes a voltage transformer having a first winding coupled to the input line and a second winding coupled to the output line. The first stage further includes a plurality of switches coupled to the input line. The first stage further includes a rectifier configured to be coupled between the second winding of the voltage transformer and the output line. The system further includes a second stage configured to receive a voltage error signal and to generate a plurality of pulse width modulation (PWM) signals based on the voltage error signal, the plurality of PWM signals being used to control the plurality of switches in the first stage.

In any of the foregoing embodiments, the second winding of the voltage transformer has a first end connected to the rectifier and a second end coupled to the rectifier with a current transformer coupled between the second end and the rectifier, the output of the rectifier being configured to be coupled to the load.

In any of the foregoing embodiments, the current transformer has a first winding coupled to the second end of the voltage transformer and a second winding, the second winding having a first end that corresponds to a second current feedback signal and a second end that corresponds to a fourth current feedback signal.

Any of the foregoing embodiments may further include: a fourth stage configured to receive the output signal and to generate a first voltage error signal; and a third stage configured to receive the first voltage error signal and to generate a second voltage error signal and a third voltage error signal based on the first voltage error signal, wherein the voltage error signal received by the second stage includes the second voltage error signal and the third voltage error signal generated by the third stage.

In any of the foregoing embodiments, the second stage further includes: a first comparator configured to compare the second voltage error signal with a first ramp signal and to output results of the comparison as a signal PWM A; a second comparator configured to compare the second voltage error signal with a second ramp signal and to output results of the comparison as a signal PWM B; a third comparator configured to compare the third voltage error signal with a third ramp signal and to output results of the comparison as a signal PWM C; and a fourth comparator configured to compare the third voltage error signal with a fourth ramp signal and to output results of the comparison as a signal PWM D.

In any of the foregoing embodiments, the third stage is further configured to receive a first current feedback signal corresponding to a current value of the first switch and a third current feedback signal corresponding to a current value of the third switch, wherein the second voltage error signal is based on a comparison of the first voltage error signal and the first current feedback signal, and wherein the third voltage error signal is based on a comparison of the first voltage error signal and the third current feedback signal.

Also disclosed is a system. The system includes a first stage configured to function as at least one of a buck topology, a boost topology, or a combination of the buck topology and the boost topology. The first stage includes an input side configured to be coupled to an input signal and having a plurality of switches. The first stage further includes an output side configured to be coupled to a load and to apply an output signal to the load. The first stage further includes a voltage transformer having a first winding coupled to the input side and a second winding coupled to the output side. The first stage further includes a rectifier configured to be coupled between the second winding of the voltage transformer and the load. The system further includes a fourth stage configured to receive the output signal and to generate a first voltage error signal. The system further includes a third stage configured to receive the first voltage error signal and to generate a second voltage error signal and a third voltage error signal based on the first voltage error signal. The first stage further includes a second stage configured to receive the second voltage error signal and the third voltage error signal and to generate a plurality of pulse width modulation (PWM) signals based on the second voltage error signal and the third voltage error signal, the plurality of PWM signals being used to control the plurality of switches in the first stage. In the system, at least one of: the input signal is configured to be an alternating current (AC) signal, the output signal is configured to be a direct current (DC) signal, and the first stage includes an auxiliary rectifier configured to rectify the AC input signal between the input signal and the plurality of switches; or the input signal is configured to be a direct current (DC) signal, and the output signal is also configured to be a DC signal.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

6

Figures 7A, 7B, 7C:
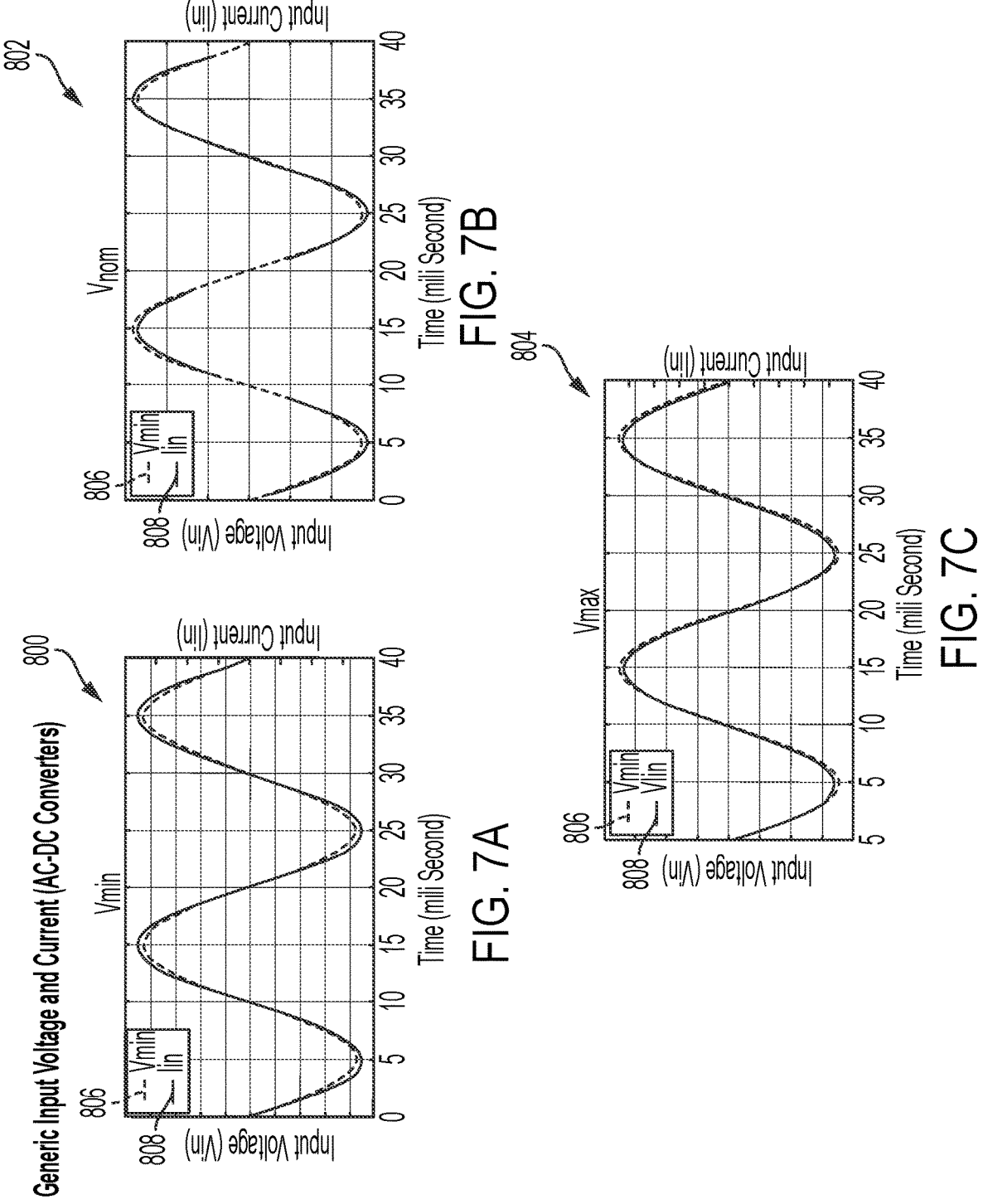
Figure 8A:
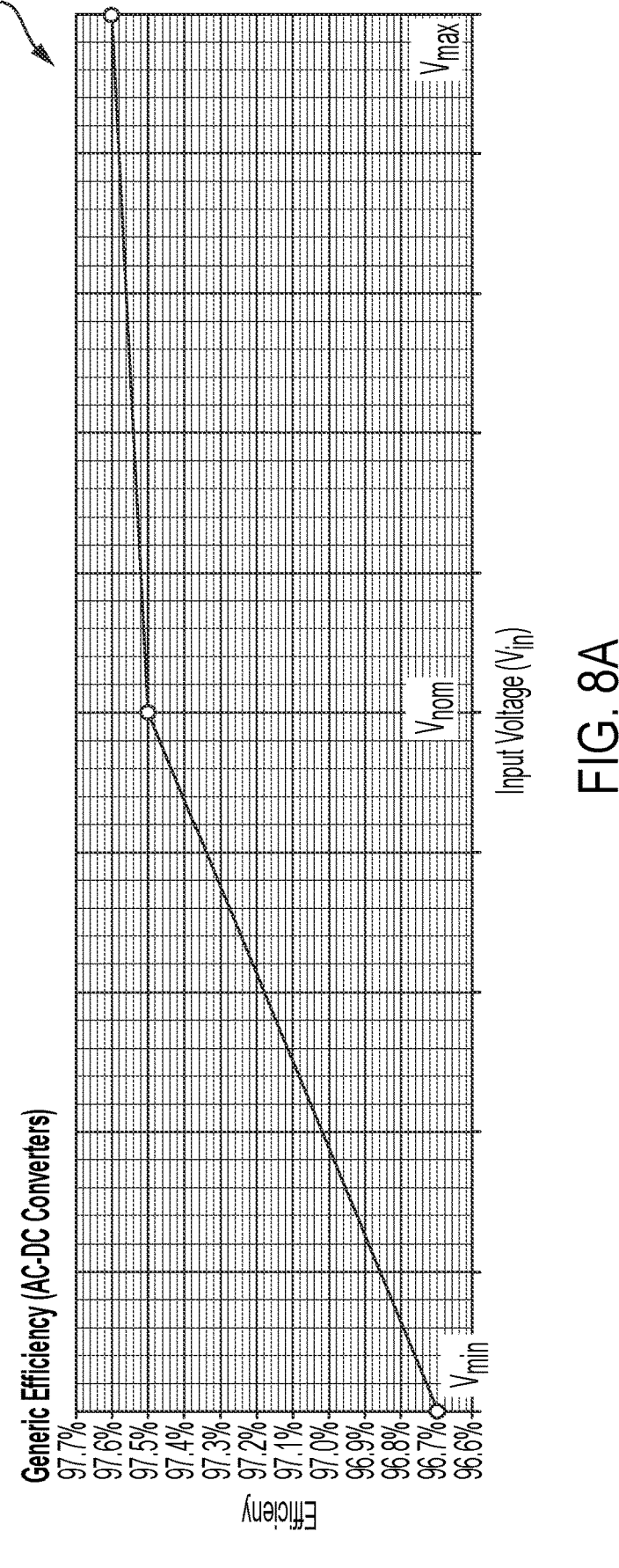
Figure 8B:
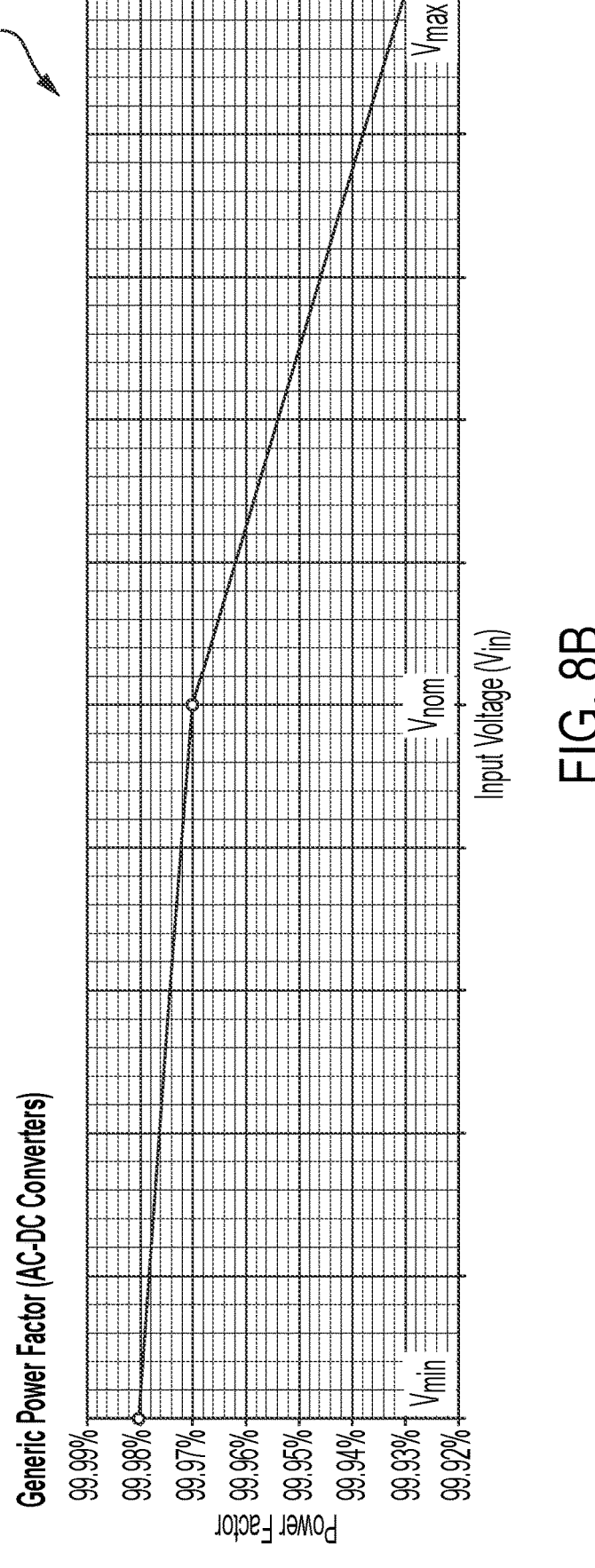

FIG. 7A, FIG. 7B, and FIG. 7C are graphs illustrating input voltage values and input current values of an AC-to-DC converter using an IBB topology as a function of time for a minimum input voltage, a nominal input voltage, and a maximum input voltage, respectively, according to various embodiments of the present disclosure;

FIG. 8A is a graph illustrating efficiency of an AC-to-DC converter using an IBB topology as a function of input voltage, according to various embodiments of the present disclosure; and FIG. 8B is a graph illustrating power factor of an AC-to-DC converter using an IBB topology as a function of input voltage, according to various embodiments of the present disclosure.

DETAILED DESCRIPTION

The present disclosure describes systems, apparatuses, and methods for isolated buck-boost (IBB) topologies. The IBB topologies disclosed herein may be used in power converters such as direct current (DC) to DC converters and alternating current (AC) to DC converters. As used herein, the term "isolated" means that an input is isolated from an output (as opposed to "non-isolated" in which the input and output are coupled to the same potential). This isolation may occur by placing a transformer between the input side and the output side of a circuit, thus allowing the input and output sides to communicate while the transformer operates as a safety barrier therebetween. The term "buck-boost" used herein means a circuit topology which may function as a boost topology, a buck topology, or a combination thereof. The IBB topology is a novel isolated topology that combines multiple non-isolated buck and boost topologies, resulting in a greater voltage range and improved efficiency of the topology. The IBB topology includes four connected stages that will be disclosed herein.

The IBB topology provides various benefits and advantages relative to conventional topologies. For example, one common base IBB topology may be used for both DC-DC converters and AC-DC converters (the AC-DC converters may be achieved by adding a few blocks to the DC-DC topology). The IBB topology operates within a relatively large voltage range (in DC-DC converters, the topology can function with a maximum input voltage that is up to two hundred times greater than a minimum input voltage; in AC-DC converters, the topology can function with a maximum input voltage that is up to ten times greater than a minimum input voltage, and can function with a maximum output voltage that is up to twenty times greater than a minimum output voltage). In addition, the IBB topology provides greater efficiency at the nominal voltage; for example, the IBB topology can achieve up to 98 percent (98%) efficiency. The IBB topology may be used as, and can replace, power factor correction (PFC), and may result in greater power density relative to conventional topologies (with zero voltage switching (ZVS) as an example of these conventional topologies). The IBB topology can also provide the same amount of power with a reduced quantity of channels, which may result in reduced volume size and cost relative to conventional topologies.

An exemplary IBB topology may include four stages. A first, or main, stage may function in any of a buck mode, a boost mode, or a combination buck and boost mode. The first stage may have a voltage transformer that isolates an input side from an output side, a plurality of switches on the input side, and a rectifier coupled to the output side and designed to rectify an output of the voltage transformer. A fourth stage may receive an output voltage from the first stage and generate a first voltage error signal based on the output voltage. A third stage may receive the first voltage error signal and generate a second and third voltage error signal based on the first voltage error signal and control signals from a controller. A second stage may have a controller that receives the voltage error signals, compares the voltage error signals with ramp signals (or signals having any other waveform), and generates control signals for controlling the switches of the first stage.

The IBB topology described herein may be used in, and improve efficiency and operation of, any of a number of applications. For example, the IBB topology may be used in low voltage to high voltage DC-to-DC converters such as in electric power trains, fuel cells, solar cells, and residential battery chargers. The IBB topology may also be used in high voltage to low voltage DC-to-DC converters such as electric power trains, commercial battery superchargers, and ultra-capacitor banks. The IBB topology may also be used in any DC-to-DC applications that require multi-isolated regulated outputs, such as multi-output DC-to-DC converters, as IBB simplifies the system and adds flexibility. The IBB topology may also be used in AC-to-DC converters, such as high output DC voltage systems with relatively great variation (e.g., battery chargers), high input AC voltage variation (e.g., battery chargers, and welding systems which may have a 30 volt DC nominal voltage-a welding system with IBB may function between 30 volts and 100 volts), and applications that utilize power factor correction (PFC) with isolated DC-link (such as uninterruptible power supply (UPS) and fast battery chargers).

Figure 1:
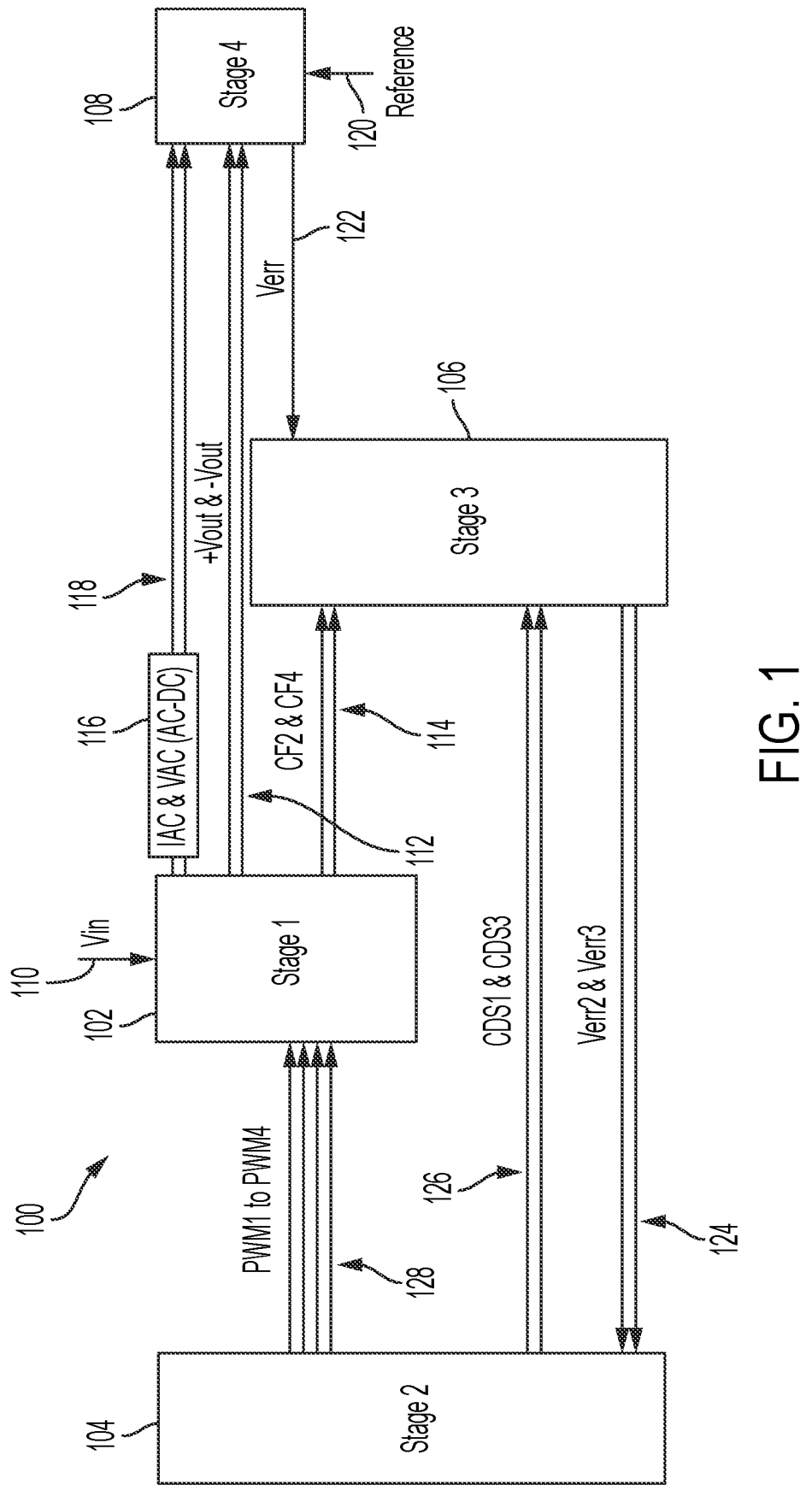
FIG. 1 is a block diagram illustrating an isolated buck-boost (IBB) topology, according to various embodiments of the present disclosure.

Referring to FIG. 1, a system 100 illustrates the IBB topology as a block diagram. As mentioned above, the IBB topology includes four interconnected stages: a first stage 102, a second stage 104, a third stage 106, and a fourth stage 108. An input voltage 110 may be provided to the first stage 102, and the first stage 102 may output an output voltage 112 that is provided to the fourth stage 108, and may also output current feedback signals 114 that are provided to the third stage 106. In AC-DC configurations, an AC block 116 may be added within our coupled to the first stage 102 and may generate AC current and voltage signals 118 that are provided to the fourth stage 108.

The fourth stage 108 may receive a reference voltage 120. The fourth stage 108 may also receive the output voltage 112 from the first stage 102. In AC-DC designs, the fourth stage 108 may also receive the AC current and voltage signals 118. The fourth stage 108 may generate a first voltage error signal 122.

The third stage 106 may receive the current feedback signals 114 from the first stage 102 and the first voltage error signal 122 from the fourth stage 108. The third stage 106 may also receive switch current detection signals 126 from the second stage 104. The third stage may also generate second and third voltage error signals 124.

The second stage 104 may receive the second and third voltage error signals 124 from the third stage 106, and may generate the current detection signals 126 to be transmitted to the third stage 106. The second stage 104 may also generate a plurality of pulse width modulation (PWM) signals 128 that are provided to the first stage 102. The PWM signals 128 may be used to drive driver circuits in the first stage 102, as discussed in further detail below.

The stages 102, 104, 106, 108 may be implemented using hardware, software, firmware, or any combination thereof. For example, at least a portion of the stages 102, 104, 106, 108 may be implemented using analog hardware with at least one of passive components or active components. Similarly, at least a portion of the stages 102, 104, 106, 108 may be implemented using digital components, such as digital signal processors (DSPs), microcontrollers, field programmable gate arrays (FPGAs), or the like. In some embodiments, the first stage 102 may be implemented using analog hardware, and the second, third, and fourth stages 104, 106, 108 may be implemented using analog hardware, digital hardware, or any combination thereof.

Figure 2A:
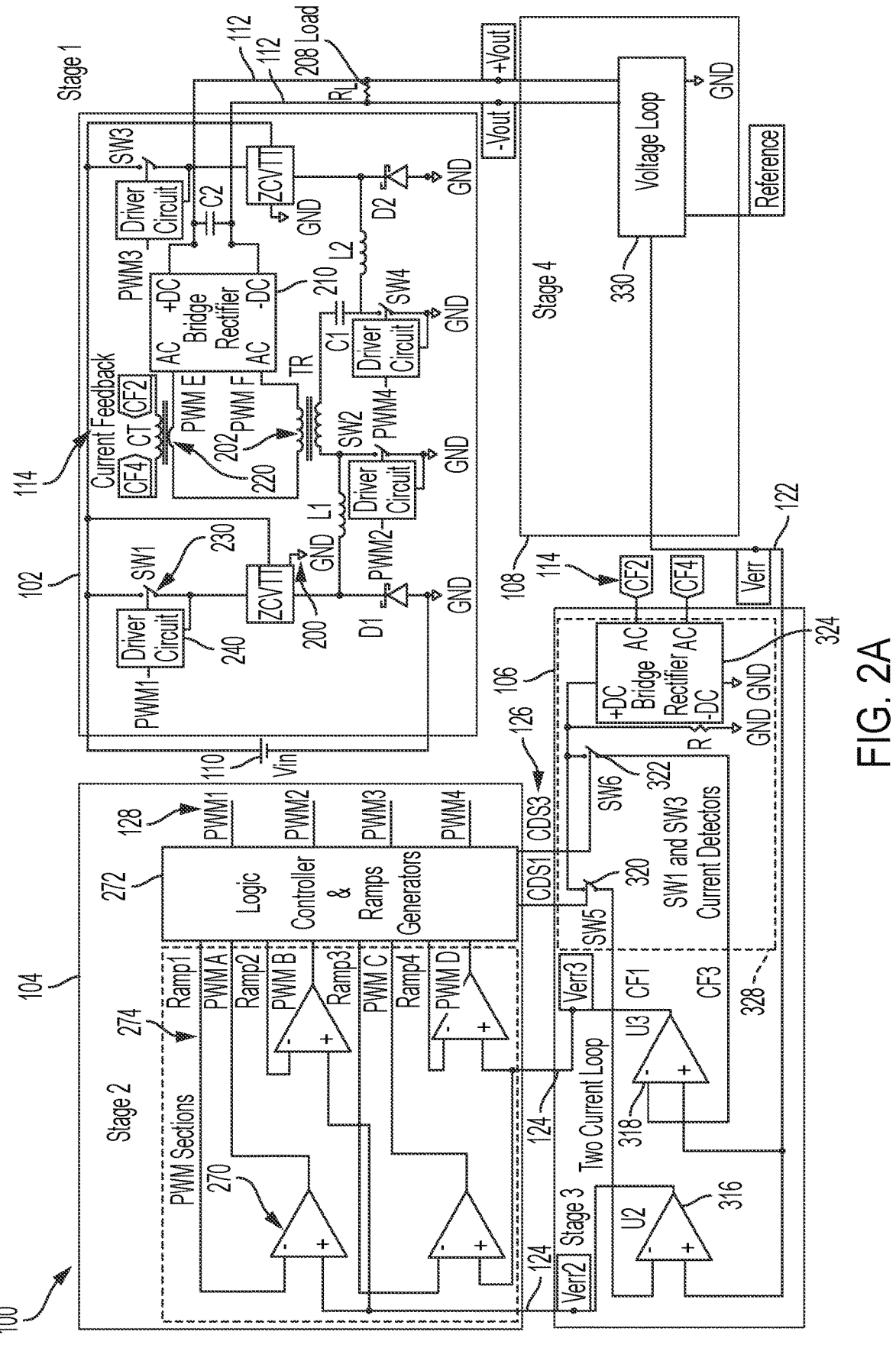
FIG. 2A is a circuit diagram illustrating details of an IBB topology for a direct current (DC)-to-DC converter, according to various embodiments of the present disclosure.

Turning to FIGS. 2A through 2E, additional details of the IBB system 100 are shown. FIG. 2A is a circuit diagram illustrating the system 100, while FIGS. 2B through 2E are circuit diagrams illustrating the features of the stages 102, 104, 106, 108. The system 100 shown in FIGS. 2A-2E are designed for use with a DC-to-DC converter. A system designed for use with an AC-to-DC converter will be shown and discussed later with reference to FIGS. 3A-3C.

Figure 2B:
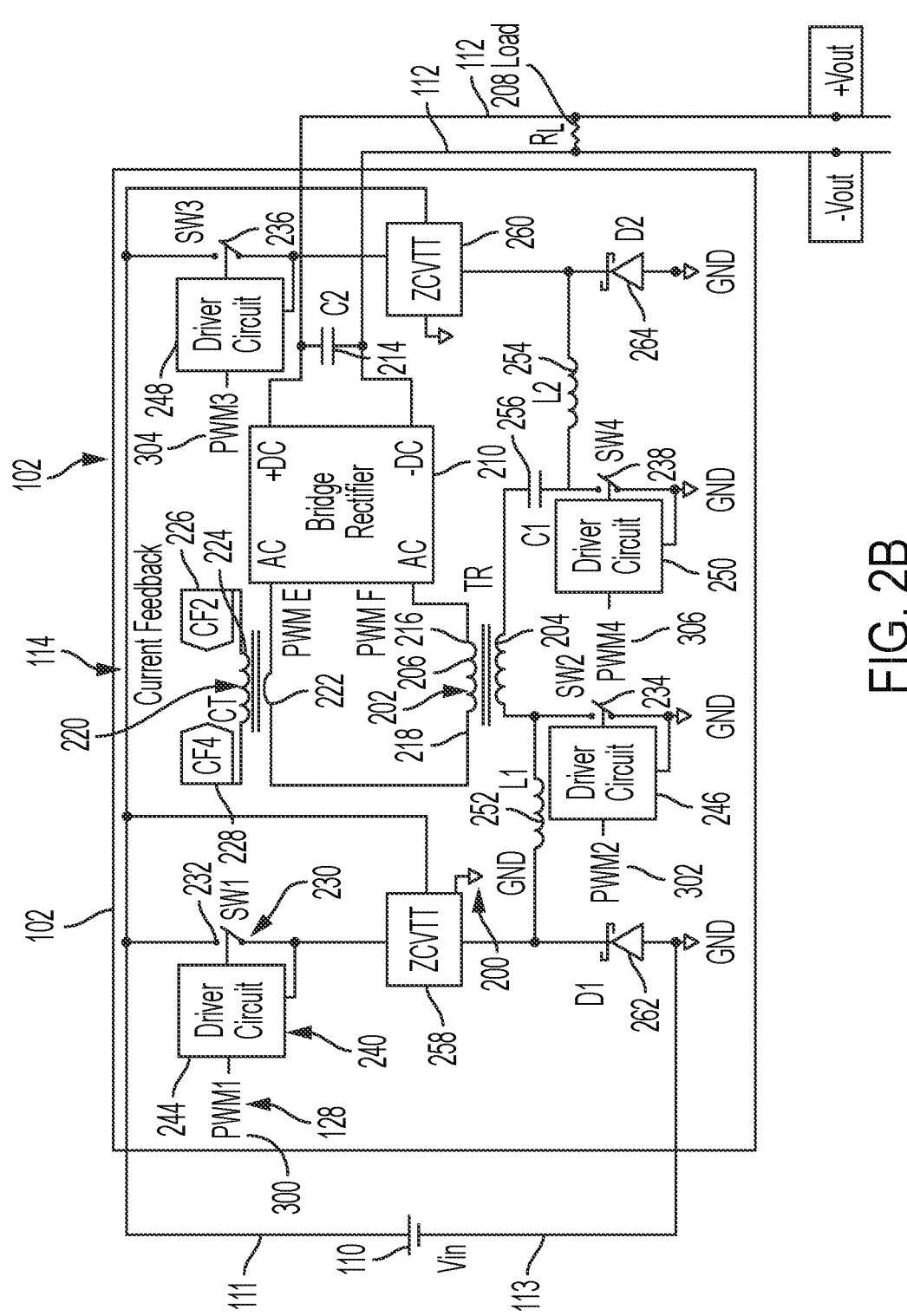
FIG. 2B is a circuit diagram illustrating features of a first stage of the IBB topology of FIG. 2A, according to various embodiments of the present disclosure.

Referring specifically to FIGS. 2A and 2B, the first stage 102 may be considered as the main stage of IBB. The first stage 102 may combine buck and boost topologies, and may utilize a transformer and novel topology to isolate the system input from the system output (which may be referred to as galvanic isolation). The first stage 102 may be designed to receive an input signal 110. The input signal 110 may be a DC input signal and may be provided onto a first input terminal 111 and a second input terminal 113. Additionally, the first stage 102 may generate or output an output signal 112 that may be provided to a load 208.

The first stage 102 may include a voltage transformer 202 which may include a first, or primary, winding 204 and a second, or secondary, winding 206. In some embodiments, the voltage transformer 202 may include two or more secondary windings 206. The voltage transformer 202 may be designed to transform any DC power signal to any other DC power signal. In that regard, the voltage of the secondary winding(s) 206 may be greater than, less than, or the same as the voltage of the primary winding 204. The voltage transformer may be designed to function within any voltage range at the primary winding 204, at the secondary winding 206, or both. In some embodiments, the secondary winding(s) 206 may be considered relatively high-power windings (i.e., may handle at least 120 volts (120 V), at least 480 V, at least 1.2 kV, at least 6 kV, or the like). The voltage transformer 202, or potential transformer, may include any parallel-connected type of instrument transformer. Components coupled to the first winding 204 may be considered as input components or components on an input side of the first stage 102; components coupled to the second winding 206 may be considered as output components or components on an output side of the first stage 102. In that regard, the voltage transformer 202 may isolate the input components from the output components.

The first stage 102 may include a rectifier 210, such as a bridge rectifier. The rectifier 210 may include any rectifier that is designed to convert an AC signal into a DC signal. For example, the rectifier 210 may include a half-wave rectifier, a full-wave rectifier, a bridge rectifier, a synchronous rectifier, a controlled rectifier, or the like. The first stage 102 may further include a current transformer 220 which includes a first winding 222 and a second winding 224. The current transformer 220 may be designed to measure current flowing through components of the first stage 102. The second winding 206 of the voltage transformer 202 may have a first end, or terminal, 216 coupled directly to the rectifier 210, and a second end, or terminal, 218 coupled to the rectifier 210 via the current transformer 220. In that regard, the second end 218 may be coupled to the first winding 222 of the current transformer 220.

The second winding 224 of the current transformer 220 may have a first end 226 and a second end 228. The ends 226, 228 of the second winding 224 of the current transformer 220 may output a second current feedback signal and a fourth feedback signal, respectively. That is, the first end 226 may carry the second current feedback signal, and the second end 228 may carry the fourth current feedback signal.

A capacitor 214 may be connected between the outputs of the rectifier 210. The output of the rectifier 210, after passing the capacitor 214, may be provided as the output signal 112. The capacitor 214 may function as a low-pass filter to reduce any signals above a specific frequency. As mentioned above, the output signal 112 may be used to power the load 208.

The first stage 102 may include a plurality of switches 230 may include a first switch 232, a second switch 234, a third switch 236, and a fourth switch 238. The plurality of switches 230 may be coupled with the input side of the first stage 102. That is, the switches 230 may be coupled with the first winding 204 of the voltage transformer 202. The switches 230 may be coupled between the input signal 110 and the first winding 204 of the voltage transformer (i.e., between the first input terminal 111 and the second input terminal 113). In particular, the first switch 232 may be positioned between the first input terminal 111 and the first winding 204 of the voltage transformer 202. The second switch 234 may be positioned between the second input terminal 113 and the first winding 204 of the voltage transformer 202, with a first inductor 252 being coupled between the second switch 234 and the first winding 204 of the voltage transformer 202. The third switch 236 may be coupled between the first input terminal 111 and the first winding 204 of the voltage transformer 202. The fourth switch 238 may be coupled between the second input terminal 113 and the first winding 204 of the voltage transformer 202, with a second inductor 254 coupled between the fourth switch 238 and the first winding 204 of the voltage transformer 202. A capacitor 256 may also be coupled between the fourth switch 238 and the first winding 204 of the voltage transformer 202.

Where used herein, a switch may refer to any circuit element or combination of circuit elements, logical components (e.g., software or firmware implemented using a controller), or combination thereof that is capable of functioning as a switch. For example, the switches 230 may each include a transistor such as a bipolar junction transistor (BJT), a field effect transistor (FET), junction FET transistor, a metal oxide semiconductor field effect transistor (MOSFET), insulated-gate bipolar transistor (IGBT), Gallium Nitride (GaN), silicon carbide (SiC), or the like, or any other physical or logical switching element.

A plurality of driver circuits 240 may include a first driver circuit 244, a second driver circuit 246, a third driver circuit 248, and a fourth driver circuit 250. A respective driver circuit 240 may be coupled to each of the switches 230, and may receive a PWM signal 128 from the second stage 104. The driver circuit 240 may drive the respective switch 230 based on the received PWM signal 128. In particular, the first driver circuit 244 may receive a first PWM signal 300 and may drive the first switch 232 based on the first PWM signal 300. The second driver circuit 246 may receive a second PWM signal 302 and may drive the second switch 234 based on the second PWM signal 302. The third driver circuit 248 may receive a third PWM signal 304 and may drive the third switch 236 based on the third PWM signal 304. The fourth driver circuit 250 may receive a fourth PWM signal 306 and may drive the fourth switch 238 based on the fourth PWM signal 306.

Based on the PWM control, the modulation duty cycle may be set based on the nominal voltage of the input 110. The PWM control controls the duty cycle of the first switch 232 and the third switch 236 to control the voltage of the output signal 112 at a constant or fixed voltage for inputs above the nominal voltage. The PWM control also controls the duty cycle of the second switch 234 and the fourth switch 238 to control the voltage of the output signal 112 at a constant or fixed voltage for inputs below the nominal voltage.

In some embodiments, one or more zero current and voltage transition technique (ZCVTT) blocks may be positioned within the first stage 102. A description of ZCVTT blocks may be found, for example, in U.S. patent application Ser. No. 17/785,039 or in International Patent Application Publication No. WO/2022/261059. For example, a first ZCVTT block 258 may be positioned between the first switch 232 and the first winding 204 of the voltage transformer 202, and a second ZCVTT block 260 may be positioned between the third switch 236 and the first winding 204 of the voltage transformer 202. In some embodiments, a third ZCVTT block may be added between the second switch 234 and the first inductor 252, and a fourth ZCVTT block may be added between the fourth switch 238 and the second inductor 254. Inclusion of the ZCVTT blocks may increase the efficiency of the system 100. For example, the ZCVTT blocks may increase the efficiency of the system 100 by about one percent, about two percent, or the like. Where used in this context, about refers to the referenced value plus or minus 25 percent of the referenced value, meaning that "about one percent" may refer to values between 0.75 percent and 1.25 percent and "about two percent" may refer to values between 1.5 percent and 2.5 percent.

One or more Zener diode may be positioned in the first stage 102. For example, a first Zener diode 262 may be positioned between the second input terminal 113 and the first winding 204 of the voltage transformer 202, and a second Zener diode 264 may be positioned between ground 200 and the first winding 204 of the voltage transformer 202.

As discussed above, the current feedback signals 226, 228 may be collected from the current transformer 220 as shown in FIGS. 2A and 2B. In some embodiments, the current feedback signals may be collected from elsewhere in the first stage 102. For example, a current transformer may be positioned on the input side of the voltage transformer 202 to detect two current feedback signals (e.g., may be positioned between the first winding 204 of the voltage transformer 202 and the capacitor 256). As another example, a first current feedback signal may be collected from a location in series with the first inductor 252, and a second current feedback signal may be collected from a location in series with the second inductor 254.

Figure 2C:
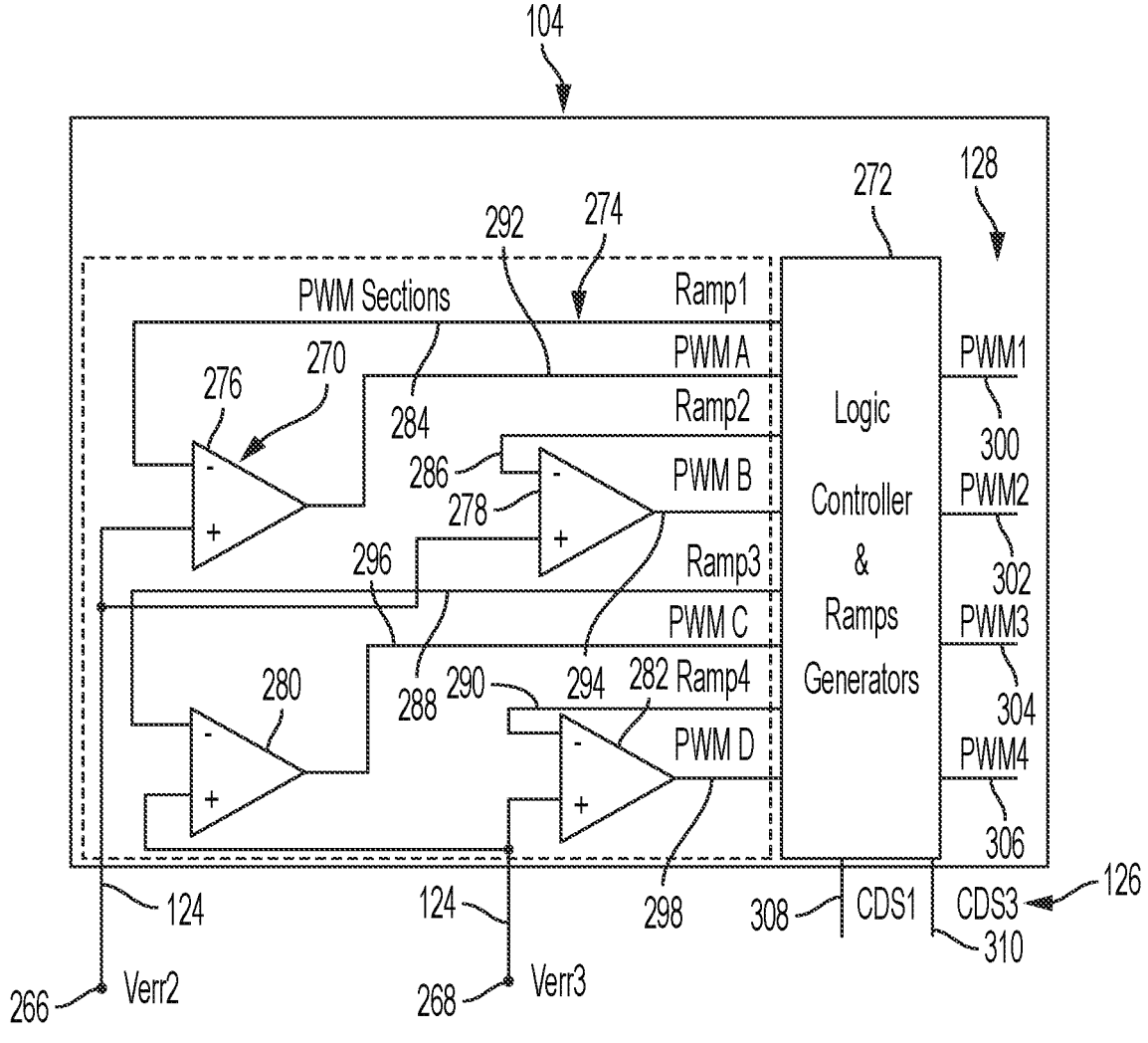
FIG. 2C is a circuit diagram illustrating features of a second stage of the IBB topology of FIG. 2A, according to various embodiments of the present disclosure.

Referring now to FIGS. 2A, 2B, and 2C, the second stage 104 may generate the PWM signals 128 that are used in FIG. 2B to drive the switches 230. Focusing on FIGS. 2A and 2C, the second stage 104 may receive as inputs second and third voltage error signals 124 (including a second voltage error signal 266 and a third voltage error signal 268) from the third stage 106. The second stage 104 may also output switch current detection signals 126 (including a first switch current detection signal 308 and a third switch current detection signal 310) from the third stage.

The second stage 104 may include a plurality of comparators 270 and a logic controller 272. Where used herein, a controller or logic device (including the controller 272) may include any controller or processor capable of performing logic functions. For example, the controller 272 may include an application-specific integrated circuit (ASIC), a general-purpose processor, a field programmable gate array (FPGA), a digital signal processor (DSP), any combination of discrete logic devices that perform logic functions, or the like. In some embodiments, the controller 272 may further include a local memory that stores instructions usable by the controller 272 to perform logic functions (e.g., cache memory, RAM, or the like).

The plurality of comparators 270 may include four comparators (including a first comparator 276, a second comparator 278, a third comparator 280, and a fourth comparator 282). The comparators 270 may include any physical or logical components which may function as comparators. For example, the comparators 270 may be formed using logical components such as via software (e.g., using a processor or controller), may be formed physical components (e.g., using one or more operational amplifier), or any combination thereof. The controller 272 may include any controller such as a microprocessor, a digital signal processor (DSP), a field programmable gate array (FPGA), or any other component capable of implementing logic functions. The functions of the controller 272 may be implemented using a single logic component or multiple logic components.

The controller 272 may output the switch current detection signals 126 (including the first switch current detection signal 308 and the third switch current detection signal 310). As will be discussed in more detail below, the switch current detection signals 126 may drive switches 320, 322 in the third stage 106.

The controller 272 may output ramp signals 274, which may include any signal that increases or decreases over time, and may repeat periodically. In some embodiments, signals having waveforms other than a ramp signal may be used in place of the ramp signals 274 without departing from the scope of the present disclosure. In some embodiments, the ramp signals 274 may increase or decrease linearly over time with periodic repeats. Each ramp signal 274 may be provided to one or more comparator 270. For example, a first ramp signal 284 may be provided to the first comparator 276, a second ramp signal 286 may be provided to the second comparator 278, a third ramp signal 288 may be provided to the third comparator 280, and a fourth ramp signal 290 may be provided to the fourth comparator 282.

The ramp signals 274 may each include a signal having any waveform such as a sawtooth wave signal generated by the controller 272. A sawtooth wave may include a non-sinusoidal waveform that resembles teeth of a plain-toothed saw with a zero-rake angle. That is, the sawtooth wave signals may ramp upward and then drop relatively sharply over a short period of time. In some embodiments, the ramp signals 274 may include a reverse sawtooth wave, or inverse sawtooth wave, in which the wave ramps downward and then rises relatively sharply. The ramp signals 274 may include a single sawtooth, intermittently triggered sawtooth, or regular and periodic sawtooth. In some embodiments, the second ramp signal 286 and the fourth ramp signal 290 may be inverted versions of the first ramp signal 284 and the third ramp signal 288, respectively, and may include an additional voltage added to the first ramp signal 284 and the third ramp signal 288.

Each comparator 270 may compare a respective ramp signal 274 with one of the second error signal 266 or the third error signal 268 and may output a respective preliminary PWM signal. For example, the first comparator 276 may compare the first ramp signal 284 with the second error signal 266 and output a result of the comparison as a first preliminary ramp signal 292, the second comparator 278 may compare the second ramp signal 286 with the second error signal 266 and output a result of the comparison as a second preliminary ramp signal 294, the third comparator 280 may compare the third ramp signal 288 with the third error signal 268 and output a result of the comparison as a third preliminary ramp signal 296, and the fourth comparator 282 may compare the fourth ramp signal 290 with the third error signal 268 and output a result of the comparison as a fourth preliminary ramp signal 298.

The controller may receive the preliminary ramp signals 292, 294, 296, 298 and may generate the PWM signals 128 based on the preliminary ramp signals 292, 294, 296, 298. In some embodiments, the controller 272 may perform signal processing on the preliminary ramp signals 292, 294, 296, 298 to generate the PWM signals 128. The controller 272 may generate the PWM signals 128 based on any functions or combinations of the preliminary ramp signals 292, 294, 296, 298. For example, the controller 272 may generate the first PWM signal 300 based on the first preliminary PWM signal 292, may generate the second PWM signal 302 based on the second preliminary PWM signal 294, may generate the third PWM signal 304 based on the third preliminary PWM signal 296, and may generate the fourth PWM signal 306 based on the fourth preliminary PWM signal 298.

As referenced above, signals having any waveform shape may be generated inside the controller 272. A combination of these controller generated waveforms and the preliminary ramp signals 292, 294, 296, 298 may be used to generate the PWM signals 128. For example, the controller 272 may generate one or more internal voltages (e.g., $V_{int1}$, $V_{int2}$, $V_{int3}$, etc.). The PWM signals 128 may be formed using any function of the internal voltages and the preliminary ramp signals 292, 294, 296, 298. In that regard, the first PWM signal 300 may be a function (f( )) of the first preliminary ramp signal 292 along with $V_{int1}$, $V_{int2}$, $V_{int3}$ (first PWM signal 300=f (first preliminary ramp signal 292, $V_{int1}$, $V_{int2}$, $V_{int3}$)), the second PWM signal 302 may be a function of the second preliminary ramp signal 294 along with $V_{int1}$, $V_{int2}$, $V_{int3}$ (second PWM signal 302=f (second preliminary ramp signal 294, $V_{int1}$, $V_{int2}$, $V_{int3}$,)), and so forth.

Referring to FIGS. 2A, 2B, 2C, and 2D, the third stage 106 may provide the second and third voltage error signals 124 to the second stage 104, and may receive the switch current detection signals 126 from the second stage 104. The third stage 106 may also receive the current feedback signals 114 from the first stage 102, and may receive a first voltage error signal 122 from the fourth stage 108. Focusing on FIGS. 2A and 2D, the third stage 106 may include a fifth comparator 316 and a sixth comparator 318. The third stage 106 may also include a fifth switch 320 and a sixth switch 322. The third stage 106 may further include a second rectifier 324.

The second rectifier 324 may receive the current feedback signals 114 from the first stage 102. For example, the rectifier 324 may receive the current feedback signals 114 at AC terminals of the rectifier 324. In particular, the second current feedback signal 226 may be received by a first AC terminal of the rectifier 324, and the fourth current feedback signal 228 may be received by a second AC terminal of the rectifier 324. The second rectifier 324 may rectify the current feedback signals 226, 228 and output a first rectified DC signal 227 and a second rectified DC signal 229 each corresponding to the current feedback signals 114.

Figure 2D:
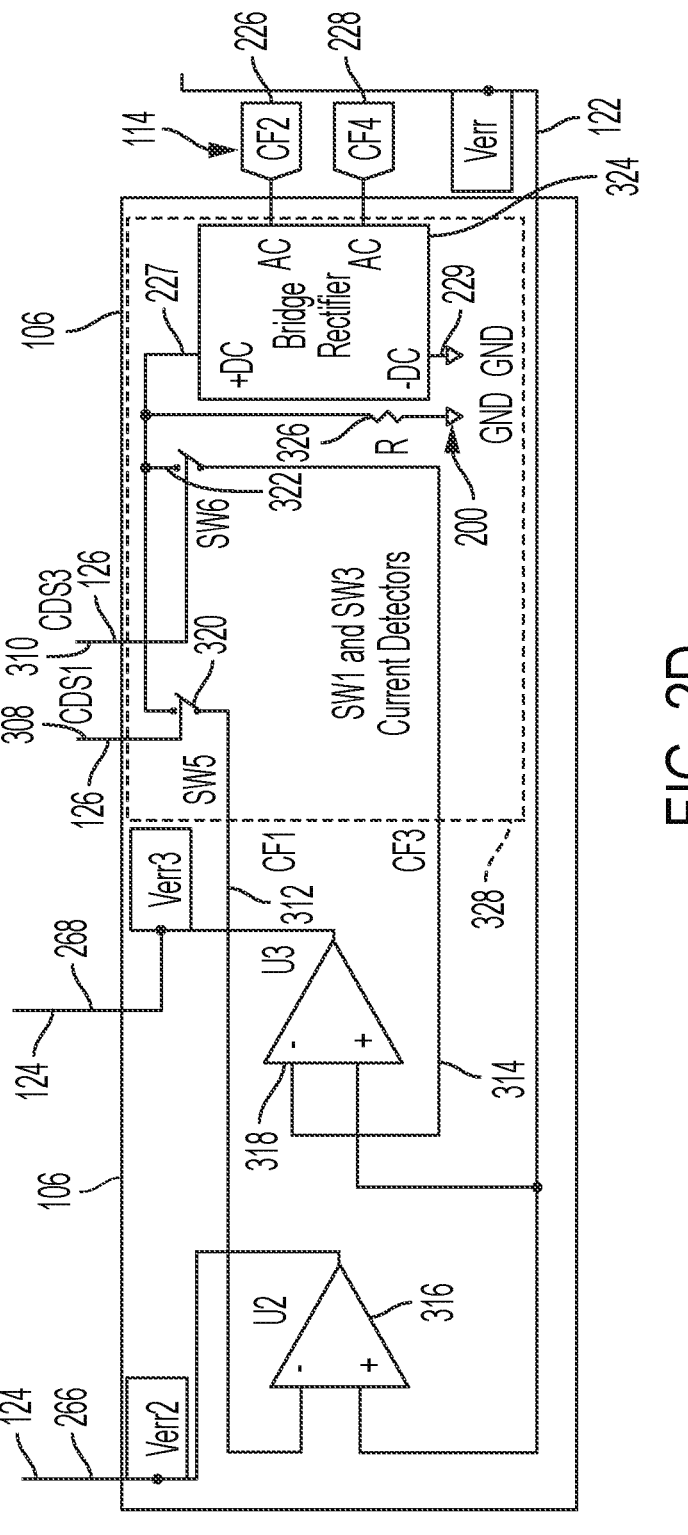
FIG. 2D is a circuit diagram illustrating features of a third stage of the IBB topology of FIG. 2A, according to various embodiments of the present disclosure.

The first rectified DC signal 227 from the rectifier 324 may be coupled with the fifth switch 320 and the sixth switch 322. Additionally, the switch current detection signals 126 may be coupled with the fifth switch 320 and the sixth switch 322. In particular, the fifth switch 320 may receive the first rectified DC signal 227 and the first switch current detection signal 308 and may output a first current feedback signal 312. The sixth switch 322 may receive the first rectified DC signal 227 and the third switch current detection signal 310 and may output a third current feedback signal 314. Referring briefly to FIGS. 2A, 2B, and 2D, the first current feedback signal 312 (and the first switch current detection signal 308) may correspond to current flowing through the first switch 232 of the first stage 102, and the third current feedback signal 314 (and the third switch current detection signal 310) may correspond to current flowing through the third switch 236 of the first stage 102. In that regard, the elements within a block 328 may function as current detectors for current values flowing through the first switch 232 and the third switch 236 of the first stage 102.

The fifth comparator 316 may receive, and compare relative to each other, the first voltage error signal 122 and the first current feedback signal 312 (corresponding to the current through the first switch 232). A result of the comparison is the second voltage error signal 266 provided to the second stage 104. The sixth comparator 318 may receive, and compare relative to each other, the first voltage error signal 122 and the third current feedback signal 314 (corresponding to the current through the third switch 236). A result of the comparison is the third voltage error signal 268 provided to the second stage 104. In that regard, the fifth comparator 316 and the sixth comparator 318 may each function as current loop.

To ensure proper error correction performance by the first error signal 122 from the fourth stage 108 to the second stage 104, the first switch current detection signal 308 may be sent to the inverting input of the fifth comparator 316 through the fifth switch 320 to generate the second voltage error signal 266. Likewise, the third switch current detection signal 310 may be sent to the inverting input of the sixth comparator 318 through the sixth switch 322 to generate the third voltage error signal 268. The second voltage error signal 266 and the third voltage error signal 268 may then be sent to the second stage 104. The voltage output to the fifth switch 320 and the sixth switch 322 may be obtained using the rectifier 324 (e.g., a full bridge rectifier) which converts the second current feedback signal 226 and the fourth current feedback signal 228 to positive DC voltage signals. Referring briefly to FIGS. 2A, 2B, 2C, and 2D, the first switch current detection signal 308 may be the inverse of the fourth PWM signal 306, and the third switch current detection signal 310 may be the inverse of the second PWM signal 302.

Turning to FIGS. 2A, 2B, 2D, and 2E, the fourth stage 108 may receive the output signal 112 from the first stage 102. In that regard, the output signal 112 may function as voltage feedback. The fourth stage 108 may also receive a reference signal 120, for example, from a power or signal source. The fourth stage 108 may output the first voltage error signal 122 that is provided to the third stage 106.

Figure 2E:
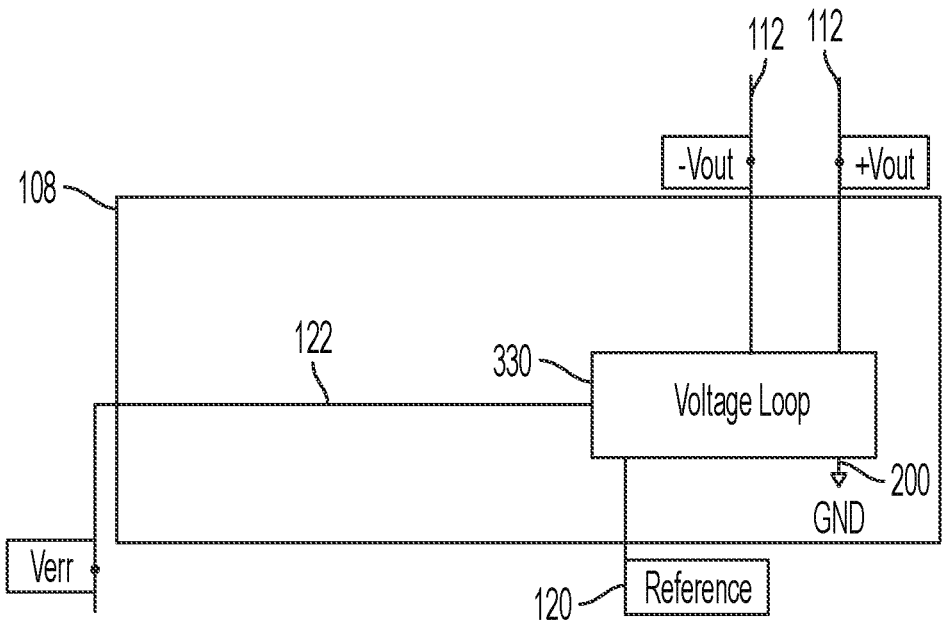
FIG. 2E is a circuit diagram illustrating features of a fourth stage of the IBB topology of FIG. 2A, according to various embodiments of the present disclosure.

Focusing on FIGS. 2A and 2E, the fourth stage 108 may include a voltage loop 330. The voltage loop 330 may receive the output signal 112 from the first stage 102 and the reference voltage 120, and may generate the error voltage

122 based on the output signal 112 and the reference voltage 120. That is, the voltage loop 330 may compare the output voltage 112 with the reference voltage 120 to produce the error voltage 122. Stated differently, the voltage loop may generate the error voltage 122 based on the reference voltage 120 and the voltage feedback.

Figure 3A:
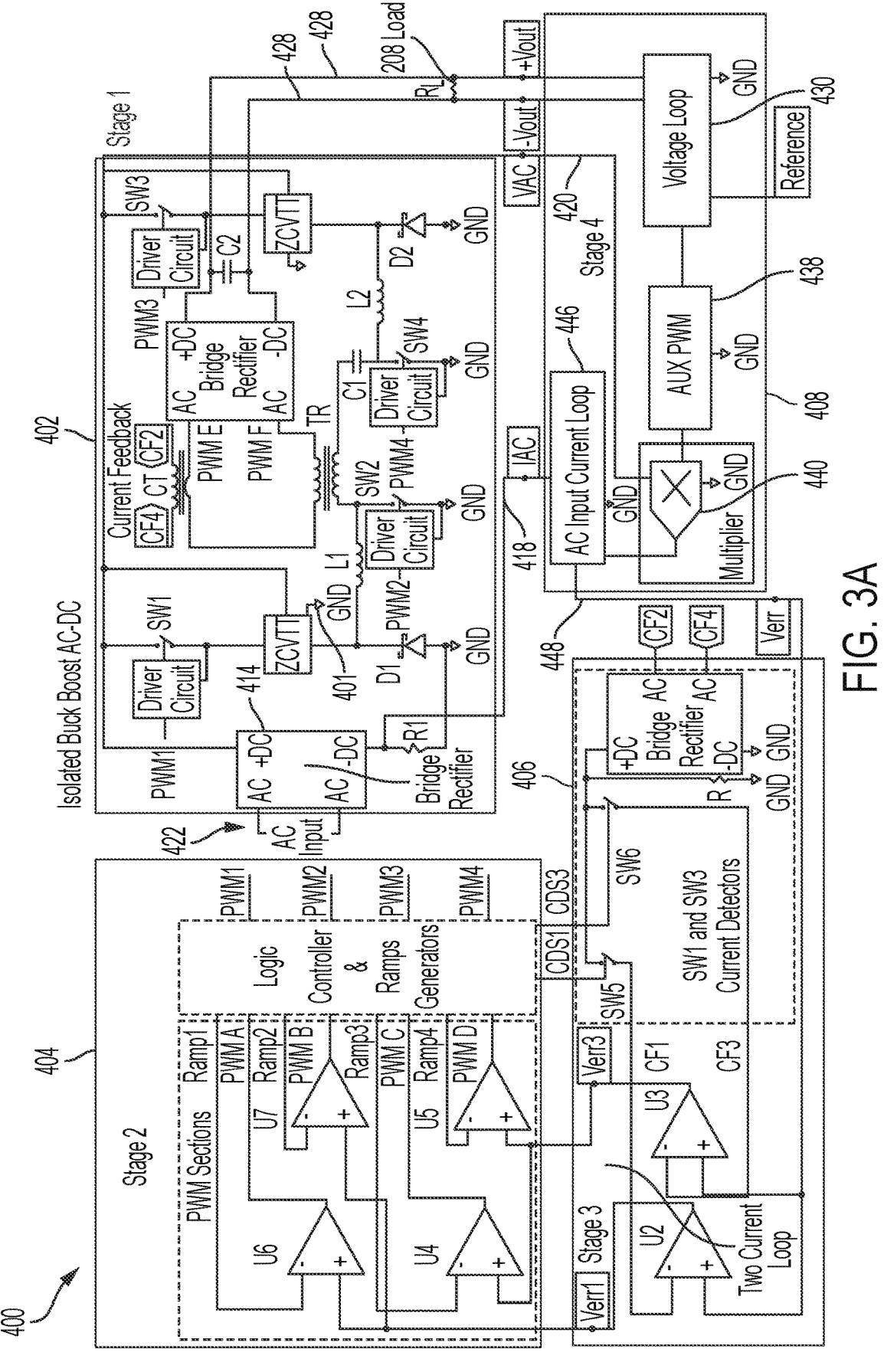
FIG. 3A is a circuit diagram illustrating details of an IBB topology for an alternating current (AC)-to-DC converter, according to various embodiments of the present disclosure.

Referring now to FIG. 3A, a system 400 shows an IBB topology for use in an AC to DC converter. The system 400 may be similar to the system 200 of FIG. 2A in that it includes four stages (i.e., a first stage 402, a second stage 404, a third stage 406, and a fourth stage 408). In addition, the second stage 404 may have similar features with a similar layout and similar inputs and outputs as the second stage 204 of FIG. 2A, and the third stage 406 may have similar features with a similar layout and similar inputs and outputs as the third stage 206 of FIG. 2A. The first stage 402 and the fourth stage 408 may have similar features as the first stage 202 and fourth stage 208, respectively, of FIG. 2A, and may include additional elements not included in the first stage 202 and the fourth stage 208 of FIG. 2A.

Figure 3B:
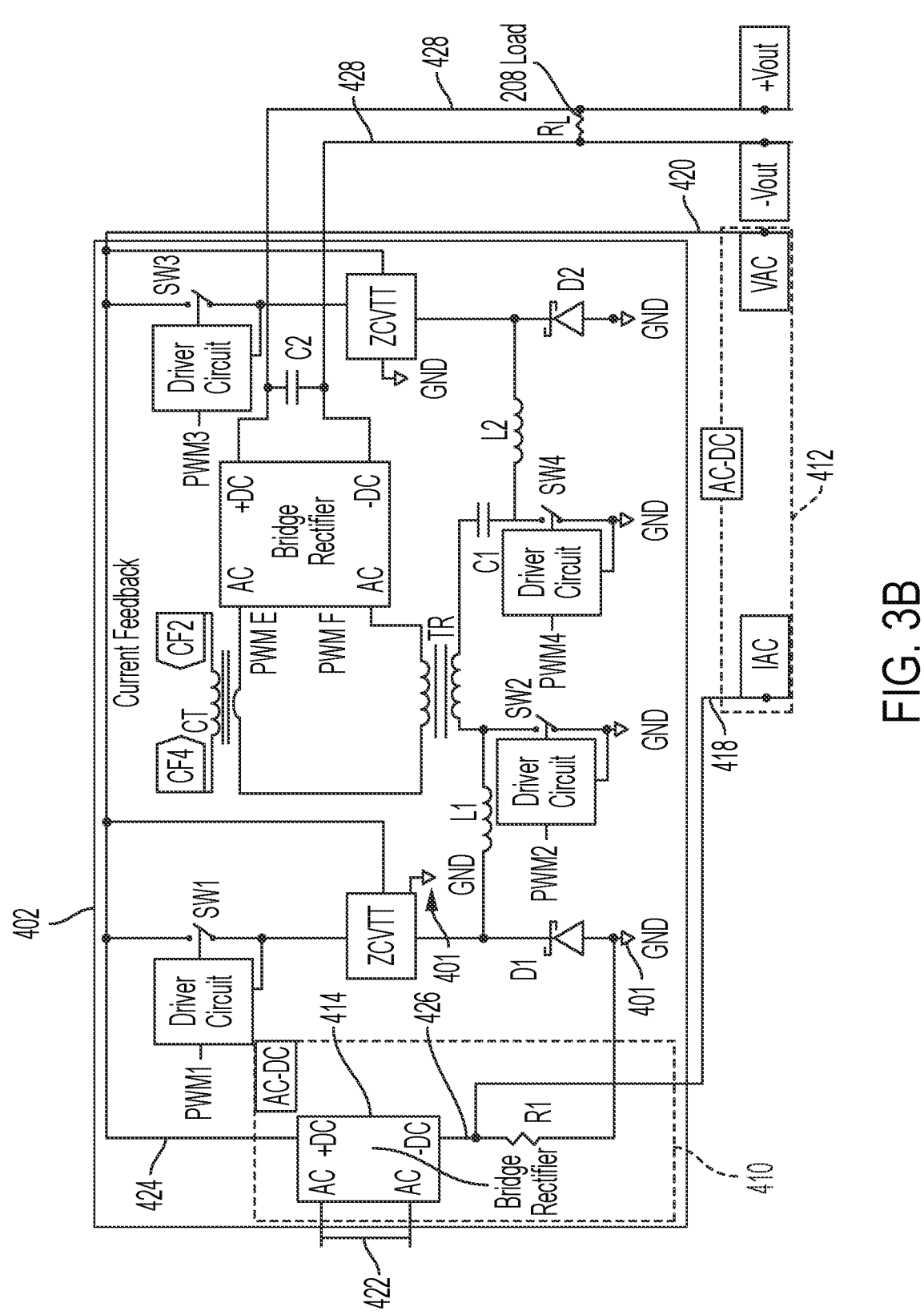
FIG. 3B is a circuit diagram illustrating features of a first stage of the IBB topology of FIG. 3A, according to various embodiments of the present disclosure.

Turning now to FIGS. 3A and 3B, additional details of the first stage 402 is shown. The first stage 402 may include all of the components that are included in the first stage 202 of FIGS. 2A and 2B with additional components that are located in a first block 410 and in a second block 412. In particular, the first block 410 of additional components may include a rectifier 414 and a resistor 416. The rectifier 414 may include any rectifier that is designed to convert an AC signal into a DC signal. For example, the rectifier 414 may include a half-wave rectifier, a full-wave rectifier, a bridge rectifier, a synchronous rectifier, a controlled rectifier, or the like.

The first stage 402 may be designed to receive an AC input signal 422. The input signal 422 may include any AC signal. The AC input signal 422 may be received by the rectifier 414, for example, by AC input terminals of the rectifier 414. The rectifier may convert the AC input signal 422 into a DC output signal, and may output the DC output signal via a positive DC output terminal 424 and a negative DC output terminal 426. The positive DC output terminal 424 may be coupled to the first switch and the third switch, in a similar manner as the input voltage 110 of FIG. 2A. The negative DC output terminal 426 may be coupled to a ground 401 in a similar manner as the input voltage 110 of FIG. 2A. However, the resistor 416 may be positioned between the negative DC output terminal 426 and the ground 401.

A line 418 may be coupled to the negative DC output terminal 426 and may correspond to an AC current signal. Additionally, a line 420 may be coupled to the positive DC output terminal 424 and may correspond to an AC voltage signal.

The first stage 402 is designed to output an output voltage 428, in a similar manner as the first stage 102 of FIG. 2A outputs the output voltage 112. The first stage 402 likewise receives four PWM signals from the second stage 404. Unlike the first stage 102 of FIG. 2A, the first stage 402 outputs the AC current signal 418 and the AC voltage signal 420.

Figure 3C:
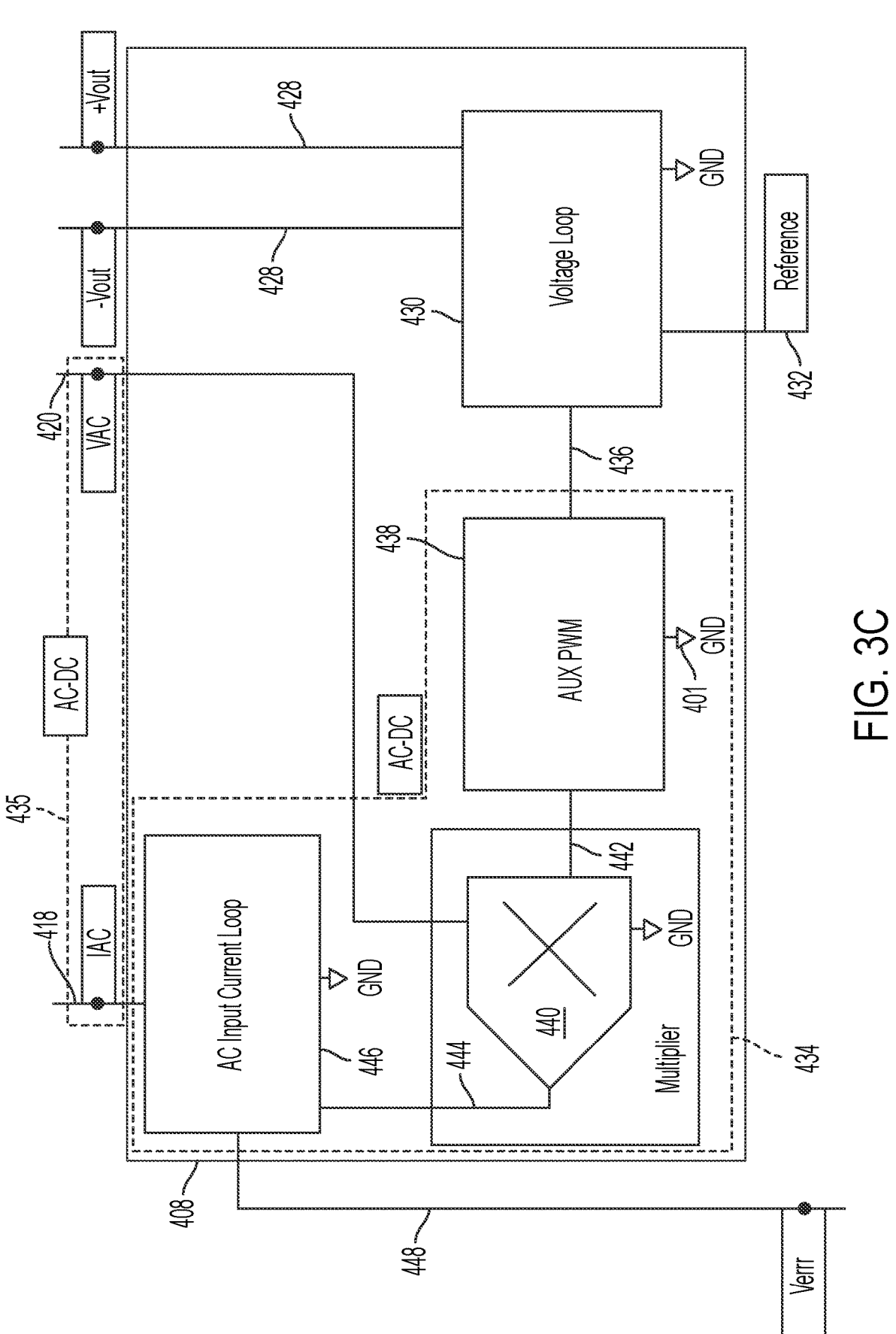
FIG. 3C is a circuit diagram illustrating features of a fourth stage of the IBB topology of FIG. 3A, according to various embodiments of the present disclosure.
Figure 4:
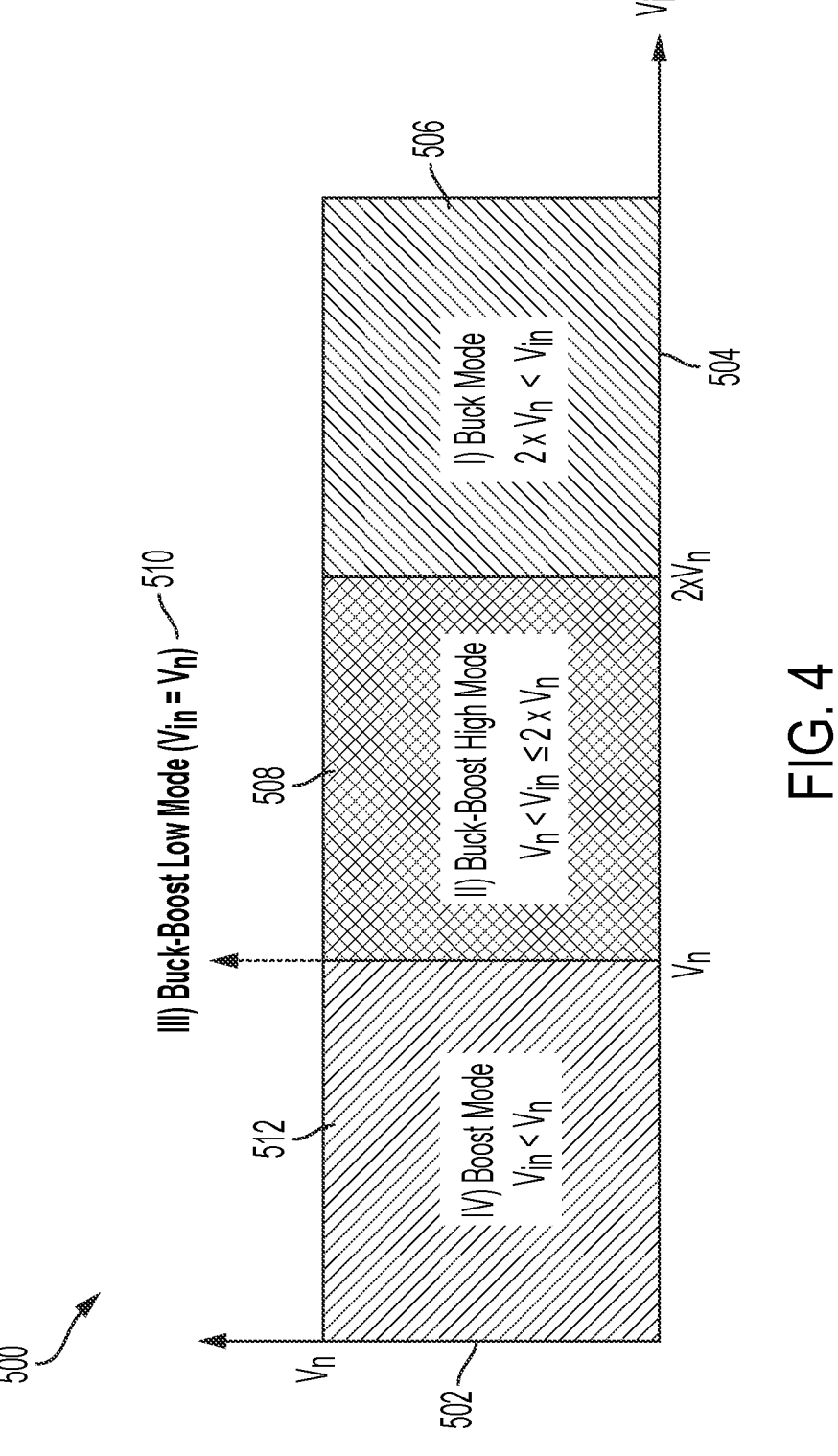
FIG. 4 is a plot showing operating modes of a first stage of an IBB topology based on an input voltage and a nominal voltage, according to various embodiments of the present disclosure.

Referring now to FIGS. 3A and 3C, the fourth stage 408 receives the output signal 428 from the first stage 402 and outputs the first voltage error signal 448 in a similar manner as the fourth stage 108 of FIG. 2A. The fourth stage 408 includes a voltage loop 430 that receives the output signal 428 and a reference signal 432, also in a similar manner as the fourth stage 108 of FIG. 2A. The fourth stage 408 also receives the AC current signal 418 and the AC voltage signal 420 that are output by the first stage 402. The fourth stage 408 may include a first block 434 and a second block 435 that include components newly added for the AC to DC converter topology.

The second block 435 of additions to the fourth stage 408 includes inputs for the AC current signal 418 and the AC voltage signal 420. The first block 434 of additions to the fourth stage 408 includes a pulse width modulation (PWM) block 438, a multiplier 440, and an AC input current loop 446. The voltage loop 430 may output a loop output signal 436 that is based on the feedback signal, or output signal 428 from the first stage 402, and the reference signal 432.

The PWM block 438 may receive the loop output signal 436 and apply pulse width modulation to the loop output signal. The PWM block 438 may include any software, hardware, or combination thereof capable of performing pulse width modulation. In that regard, the PWM block 438 may convert the loop output signal 436 into a rectangular wave signal. The rectangular wave signal may have a varying duty cycle. The PWM block 438 may output a PWM output signal 442.

The multiplier 440 may receive the PWM output signal 442 and may multiply the PWM output signal 442 by the AC voltage signal 420 that is received from the first stage 402. The multiplier 440 may include any software, hardware, or combination thereof capable of multiplying two or more signals together. The multiplier 440 may output the result of the multiplication of the PWM output signal 442 by the AC voltage signal 420 as a multiplier output signal 444.

The current loop 446 may receive the multiplier output signal 444 and the AC current signal 418, and may output the voltage error signal 448 based on the multiplier output signal 444 and the AC current signal 418. The voltage error signal 448 may be provided to the third stage 406 in a similar manner as the voltage error signal 122 of FIG. 2A.

Turning now to FIGS. 2A, 2B, 3A, 3B, and 4, the first stage 102, 402 may toggle between four modes: buck, buck-boost high, buck-boost low, and boost. These modes are illustrated in a plot 500 of the nominal voltage ($V_n$) 502 and the input voltage ($V_{in}$) 504. The nominal voltage refers to the standard or reference voltage level assigned to the system in which the topology is used. In that regard, values of components in the systems 100, 400 may be changed to adjust the nominal voltage The first stage 102, 402 may function in the first mode, or buck mode, when the input voltage 504 is greater than two times the nominal voltage 502 ($2 \times V_n < V_{in}$). The first stage 102, 402 may function in the second mode, or buck-boost high mode, when the input voltage 504 is greater than the nominal voltage 502 and the input voltage 504 is less than two times the nominal voltage 502 ($V_n < V_{in} \leq 2 \times V_n$). The first stage 102, 402 may function in the third mode, or buck-boost low mode, when the input voltage 504 is equal to the nominal voltage 502 ($V_n = V_{in}$). The first stage 102, 402 may function in the fourth mode, or boost mode, when the input voltage 504 is less than the nominal voltage 502 ($V_{in} < V_n$).

Operation of the first stage 102 in each of the modes will now be discussed. One skilled in the art will realize that operation of the first stage 402 of the AC-DC topology illustrated in FIGS. 3A and 3B will be similar to that of the first stage 102 of the DC-DC topology. In that regard, the following discussion will be directed to the system 100 of FIGS. 2A and 2B and, specifically, directed to the first stage 102 of FIGS. 2A and 2B.

When the voltage of the input signal 110 exceeds twice the nominal voltage of the system 100, the system 100 may function in the buck mode. In the buck mode, the first switch 232, the fourth switch 238, and the first inductor 252 may generate a first half of a square waveform voltage on the primary, or input, side of the voltage transformer 202 (i.e., the first winding 204). Also in the buck mode, the second switch 234, the third switch 236, and the second inductor 254 may generate a second half of the square waveform voltage, also on the primary side of the voltage transformer 202. The combination of the two half-square waveforms on the primary side of the transformer 202 produces a square wave input voltage with a duty cycle that may be close to 50 percent (50%). The rectifier 210 (which may be a full bridge rectifier) and the capacitor 214 are coupled to the secondary side of the voltage transformer 202 (i.e., the second winding 206) to filter out the output voltage received by the second winding 206 of the transformer 202—the filtered output voltage may then be output as the output signal 428. The capacitor 256 reduces or eliminates any DC voltage on the primary side of the transformer 202. The current transformer 220 on the secondary side of the voltage transformer 202 creates the current feedback signals that are output by the first end 226 and the second end 228 of the second winding 224 of the current transformer 220. The current feedback signals output by the first end 226 and the second end 228 may be used by the third stage 106 to monitor the error current value.

When the voltage of the input signal 110 is less than twice the nominal voltage of the system 100 and the input voltage is greater than the nominal voltage of the system, the system 100 may function in the buck-boost high mode. In the buck-boost high mode and referring to FIGS. 2A, 2B, and 2C, the signal PWM1 300 may be driven by a function of the signal PWM A 292. The first switch 232, the second switch 234, and the first inductor 252 may operate in boost mode, while the first switch 232 and the fourth switch 238 may operate in buck mode to generate a half of a square wave-form voltage on the primary side of the voltage transformer 202. Based on the signal PWM1 300, and the signal PWM3 304 on the third switch 236, the fourth switch 238 and the second inductor 254 may operate in boost mode, and the signal PWM3 304 on the second switch 234 and third switch 236 may operate in buck mode to complete the square-wave waveform on the primary side of the voltage transformer 202.

When the voltage of the input signal 110 is equal to the nominal voltage of the system 100 (or substantially equal to the nominal voltage; where used in this context, substantially may refer to the value plus or minus 5 percent, 10 percent, 20 percent, or the like of the value), the system 100 may function in the buck-boost low mode. In the buck-boost low mode, the signal PWM1 300 may operate at the full duty cycle, and the first switch 232, the second switch 234, and the first inductor 252 may operate in the boost mode. Also, the first switch 232 and the fourth switch 238 may operate to generate a half square waveform on the primary side of the voltage transformer 202 based on the signal PWM1 300. The signal PWM3 304 may operate at full duty cycle on the third switch 236 and the fourth switch 238 which, along with the second inductor 254, may operate in boost mode. The second switch 234 and the third switch 236 may operate in buck mode to complete the square-wave waveform on the primary side of the voltage transformer 202.

When the voltage of the input signal 110 is less than the nominal voltage of the system 100, the system 100 may function in the boost mode. In the boost mode, the first switch 232 and the third switch 236 may operate at a maximum duty cycle. By changing the duty cycle to greater than 50 percent on the second switch 234 and the fourth switch 238, as well as the first inductor 252 and the second inductor 254, the DC output voltage 112 may be regulated and the power output may be de-rated.

Figures 5A, 5B:
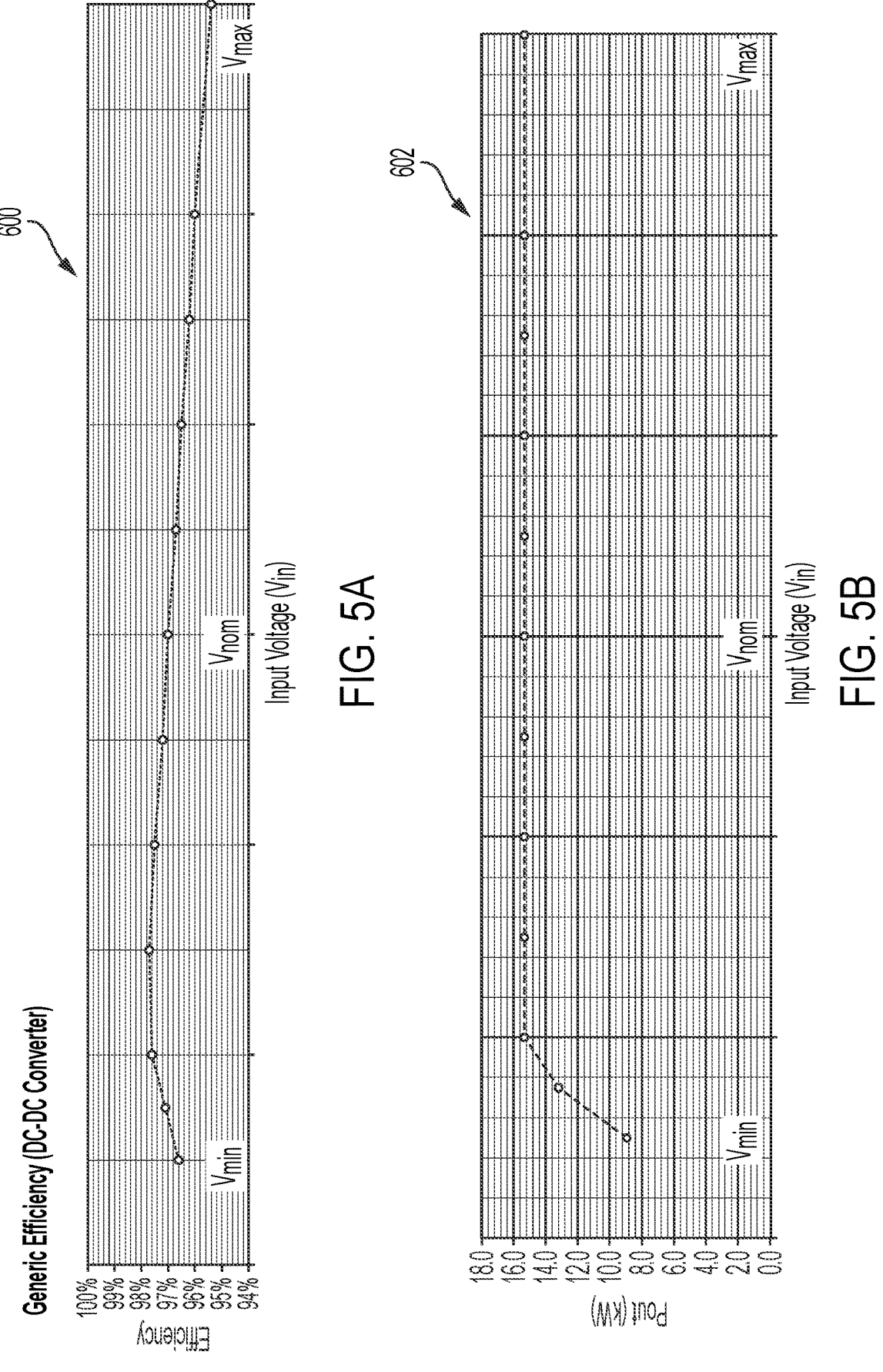
FIG. 5A is a graph illustrating efficiency of a DC-to-DC converter using an IBB topology as a function of input voltage, according to various embodiments of the present disclosure.
FIG. 5B is a graph illustrating output power of a DC-to-DC converter using an IBB topology as a function of the input voltage, according to various embodiments of the present disclosure.

Referring now to FIGS. 2A, 5A, and 5B, graphs illustrating exemplary efficiency and output power of the system 100 for a DC-to-DC converter are shown. In particular, a first graph 600 illustrates efficiency of the system 100 as a function of input voltage between a minimum voltage ($V_{min}$) and a maximum voltage ($V_{max}$). As shown, the efficiency increases from the minimum voltage until it reaches a maximum of about 97.5 percent between the minimum voltage and the nominal voltage ($V_{nom}$), and drops from the maximum of about 97.5 percent until the maximum voltage.

A second graph 602 illustrates output power (Pout) in kilowatts (kW) as a function of input voltage between the minimum voltage and the maximum voltage. As shown, the output power increases from the minimum voltage to a first input voltage that is between the minimum voltage and the nominal voltage, and then remains constant from the first input voltage to the maximum voltage.

Figure 6A:
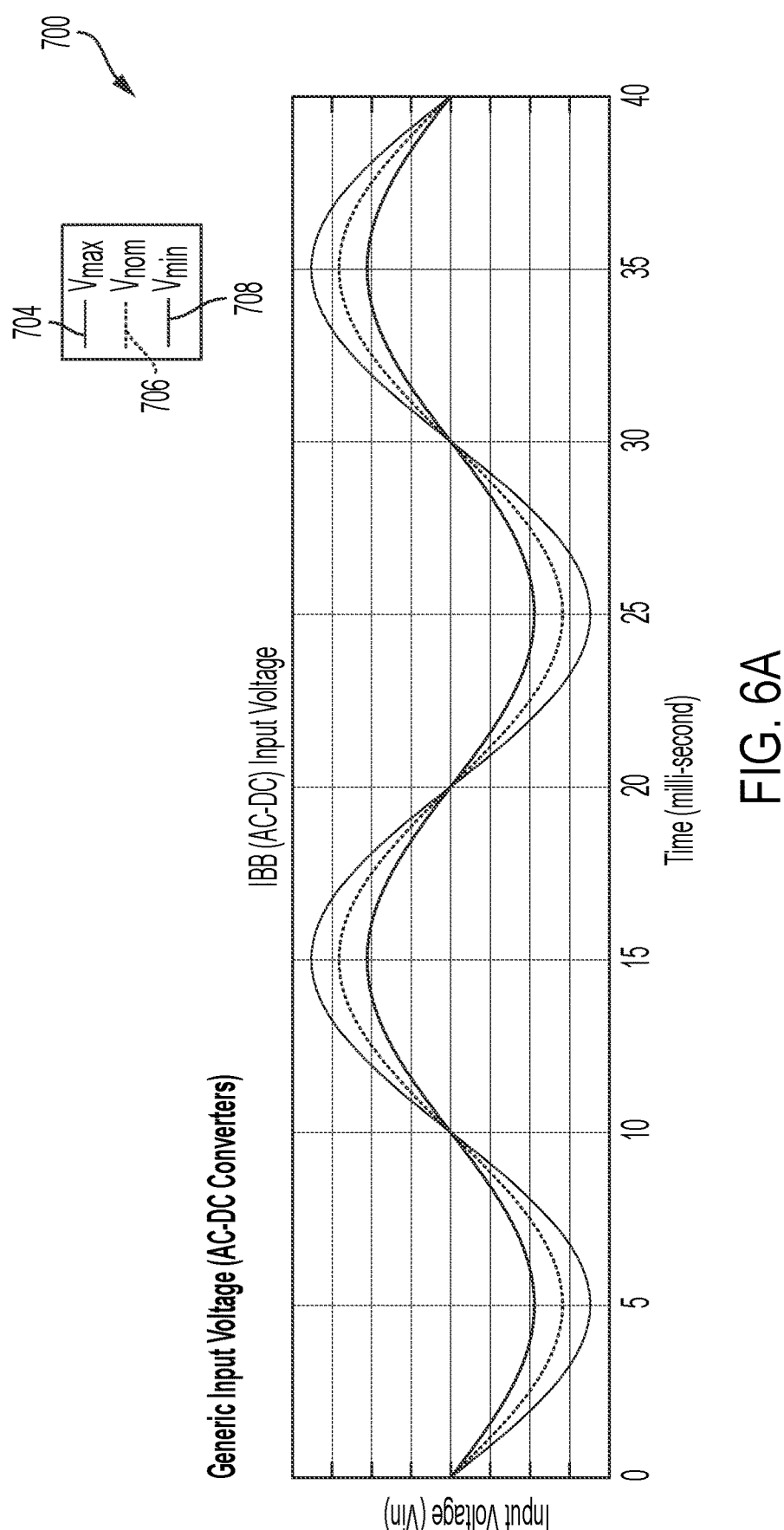
FIG. 6A and FIG. 6B are graphs illustrating input voltage values and input current values, respectively, as a function of time for a maximum input voltage, a nominal input voltage, and a minimum input voltage of an AC-to-DC converter using an IBB topology, according to various embodiments of the present disclosure.
Figure 6B:
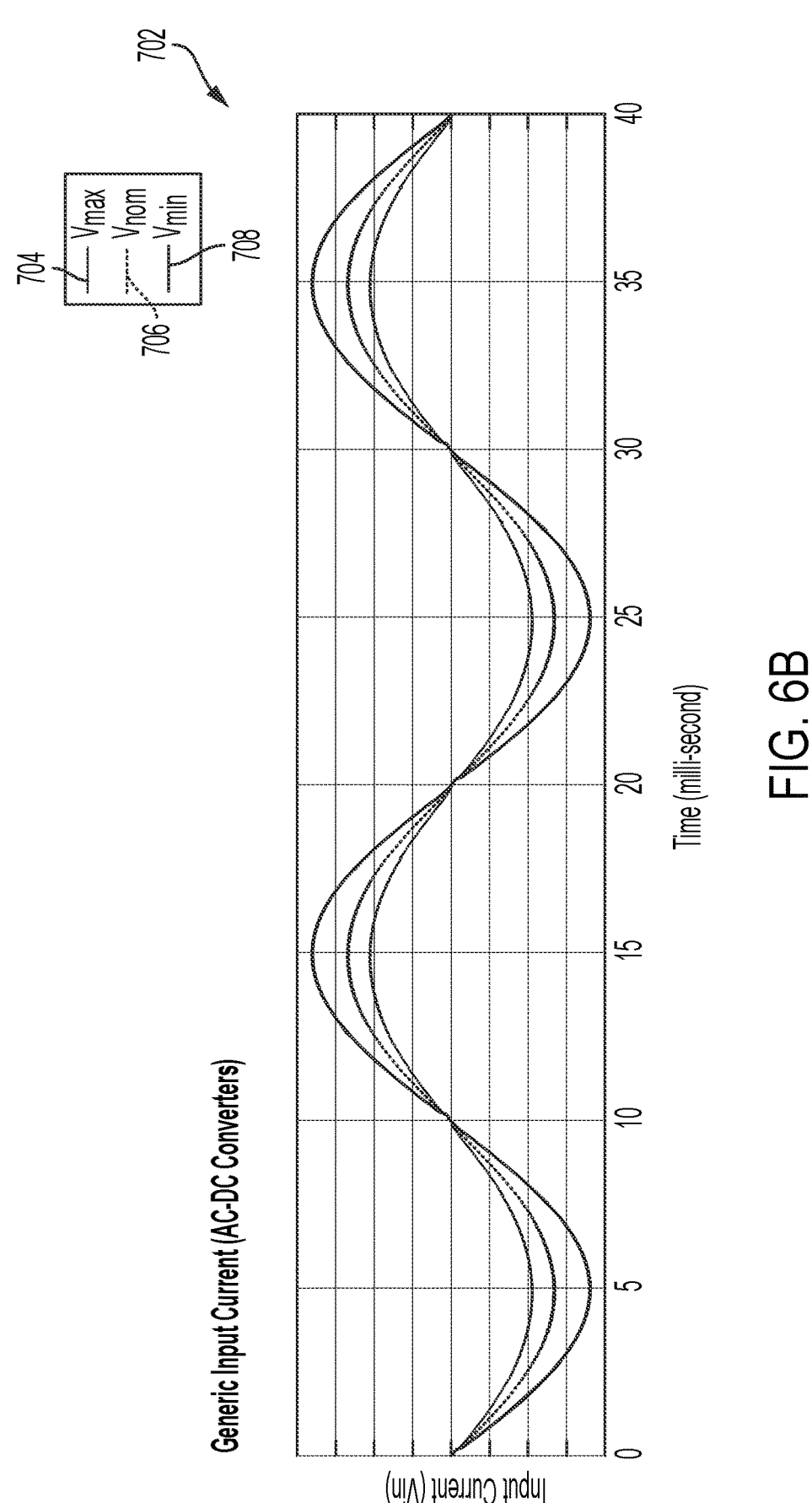

Turning to FIGS. 3A, 6A, and 6B, generic examples of input voltage and input current for an AC-to-DC converter (i.e., the topology 400 shown in FIG. 3A) are shown. Generic examples of input voltage ($V_{in}$, the voltage at the input 422) are shown in FIG. 6A for a maximum input voltage 704, a nominal input voltage 706, and a minimum input voltage 708; generic examples of input current ($I_{in}$, the current at the input 422) are shown in FIG. 6B for the maximum voltage 704, the nominal voltage 706, and the minimum voltage 708.

Referring now to FIGS. 3A, 7A, 7B, and 7C, generic graphs showing input voltage ($V_{in}$) and input current ($I_{in}$) (both applied at the input 422) plotted over time for an AC-to-DC converter (i.e., the topology 400 shown in FIG. 3A) are shown. FIG. 7A is a plot 800 showing input voltage 806 and input current 808 for a minimum input voltage ($V_{min}$). FIG. 7B is a plot 802 showing input voltage 806 and input current 808 for a nominal input voltage ($V_{nom}$). FIG. 7C is a plot 804 showing input voltage 806 and input current 808 for a maximum input voltage ($V_{max}$).

Turning now to FIGS. 3A, 8A, and 8B, graphs illustrating exemplary efficiency and power factor of the system 400 for an AC-to-DC converter are shown. In particular, a first graph 900 illustrates efficiency of the system 400 as a function of input voltage between a minimum voltage ($V_{min}$) and a maximum voltage ($V_{max}$). As shown, the efficiency increases from the minimum voltage until it reaches the nominal voltage ($V_{nom}$) at which point the efficiency is approximately 97.5 percent, and continues increasing to a maximum of about 97.6 percent at the maximum voltage ($V_{max}$). A second graph 902 illustrates power factor (PF) of the system as a function of input voltage between the minimum voltage and the maximum voltage. Power factor may refer to a ratio of working power (measured in kilowatts, kW) to apparent power (measured in kilovolt amperes, kVA). As shown, the power factor is approximately 99.98 percent at the minimum voltage, decreases to about 99.97 percent at the nominal voltage, and decreases more rapidly until the maximum voltage at which point it is approximately 99.93 percent.

The drawings and descriptions herein are exemplary and are not intended to be limiting in any way. In general, the features of the present disclosure may be implemented in hardware, software, firmware, or any combination thereof. Various block diagrams and circuit diagrams are disclosed herein. Those skilled in the art will realize that the features of the present disclosure may be implemented using blocks and/or circuits that differ from those included in this disclosure without departing from the scope of the present disclosure. Multiple blocks, circuits, or circuit components are shown in the drawings and described in the detailed description; one skilled in the art will realize that these blocks, circuits, or circuit components may include digital components, analog components, or combinations thereof, and that the functions of the blocks, circuits, or circuit components may be performed by software, hardware, firmware, or any combination thereof. In addition, the drawings illustrate, and the specification describes, simulation results; these results illustrate benefits achieved by the systems and methods of the present disclosure but are not intended to show the limits of such benefits. A circuit or system designed using the features disclosed herein may achieve improved benefits relative to those shown in the simulation results. Where used throughout the specification and drawings, any reference to greater than may include greater than or equal to, any reference to less than may include less than or equal to, and any reference to equal to may include substantially equal to (i.e., within 5 percent, 10 percent, 20 percent, or the like).

Where used throughout the specification and the claims, "at least one of A or B" includes "A" only, "B" only, or "A and B." Furthermore, "at least one of A and B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that scope shall not be restricted, except in light of the appended claims and their equivalents.

What is claimed is:

1. A circuit, comprising:
a first stage configured to function as at least one of a buck topology, a boost topology, or a combination of the buck topology and the boost topology, the first stage having:
an input side configured to be coupled to an input signal and having a plurality of switches,
an output side configured to be coupled to a load and to apply an output signal to the load,
a voltage transformer having a first winding coupled to the input side and a second winding coupled to the output side, and
a rectifier configured to be coupled between the second winding of the voltage transformer and the load;
a fourth stage configured to receive the output signal and to generate a first voltage error signal;
a third stage configured to receive the first voltage error signal and to generate a second voltage error signal and a third voltage error signal based on the first voltage error signal; and
a second stage configured to receive the second voltage error signal and the third voltage error signal and to generate a plurality of pulse width modulation (PWM) signals based on the second voltage error signal and the third voltage error signal, the plurality of PWM signals being used to control the plurality of switches in the first stage.

2. The circuit of claim 1, wherein the second winding of the voltage transformer has a first end connected to the rectifier and a second end coupled to the rectifier with a current transformer coupled between the second end and the rectifier, the output of the rectifier being configured to be coupled to the load.

3. The circuit of claim 2, wherein the current transformer has a first winding coupled to the second end of the voltage transformer and a second winding, the second winding having a first end that corresponds to a second current feedback signal and a second end that corresponds to a fourth current feedback signal.

4. The circuit of claim 1, wherein the input signal is received from a first input terminal and a second input terminal, and the plurality of switches including:

a first switch located between the first input terminal and the first winding of the voltage transformer;

a second switch located between the second input terminal and the first winding of the voltage transformer with a first inductor coupled between the second switch and the first winding;

a third switch located between the first input terminal and the first winding of the voltage transformer; and a fourth switch located between the second input terminal and the first winding of the voltage transformer with a second inductor coupled between the fourth switch and the first winding.

5. The circuit of claim 1, wherein the input signal is configured to be an alternating current (AC) signal, the output signal is configured to be a direct current (DC) signal, and the first stage includes an auxiliary rectifier configured to rectify the AC input signal between the input signal and the plurality of switches.

6. The circuit of claim 1, wherein the input signal is configured to be a direct current (DC) signal, and the output signal is also configured to be a DC signal.

7. The circuit of claim 1, wherein the fourth stage includes a voltage loop configured to receive the output signal and a reference signal and to output the first voltage error signal.

8. The circuit of claim 7, wherein the input signal is configured to be an alternating current (AC) signal, the output signal is configured to be a direct current (DC) signal, and the fourth stage further includes an auxiliary PWM block configured to receive an output of the voltage loop, a multiplier configured to multiply the output of the voltage loop by a voltage value of the input signal, and an AC input current loop configured to receive an output of the multiplier and a current value of the input signal and to generate an output signal to function as the first voltage error signal.

9. The circuit of claim 7, wherein the input signal is configured to be a direct current (DC) signal, the output signal is also configured to be a DC signal, and the fourth stage is configured to output the first voltage error signal from the voltage loop as the first voltage error signal received by the third stage.

10. The circuit of claim 1, wherein the third stage is further configured to receive a first current feedback signal corresponding to a current value of the first switch and a third current feedback signal corresponding to a current value of the third switch, wherein the second voltage error signal is based on a comparison of the first voltage error signal and the first current feedback signal, and wherein the third voltage error signal is based on a comparison of the first voltage error signal and the third current feedback signal.

11. The circuit of claim 1, wherein the second stage further includes:

a first comparator configured to compare the second voltage error signal with a first ramp signal and to output results of the comparison as a signal PWM A;

a second comparator configured to compare the second voltage error signal with a second ramp signal and to output results of the comparison as a signal PWM B;

a third comparator configured to compare the third voltage error signal with a third ramp signal and to output results of the comparison as a signal PWM C; and a fourth comparator configured to compare the third voltage error signal with a fourth ramp signal and to output results of the comparison as a signal PWM D.

12. The circuit of claim 11, wherein the second stage further includes a controller configured to output the first ramp signal, the second ramp signal, the third ramp signal, and the fourth ramp signal, and to output a first switch current detection signal corresponding to current flowing through the first switch in the first stage and a third switch current detection signal corresponding to current flowing through the third switch in the first stage.

13. The circuit of claim 11, wherein:

the plurality of PWM signals generated by the second stage include a first PWM signal to control a first switch of the plurality of switches in the first stage, a second PWM signal to control a second switch of the plurality of switches in the first stage, a third PWM signal to control a third switch of the plurality of switches in the first stage, and a fourth PWM signal to control a fourth switch of the plurality of switches in the first stage; and the second stage further includes a controller configured to generate the first PWM signal based on the signal PWM A, to generate the second PWM signal based on the signal PWM B, to generate the third PWM signal based on the signal PWM C, and to generate the fourth PWM signal based on the signal PWM D.

14. A system, comprising:

a first stage configured to function as at least one of a buck topology, a boost topology, or a combination of the buck topology and the boost topology, the first stage coupled to an input line and an output line configured to be coupled to a load, the first stage having:

a voltage transformer having a first winding coupled to the input line and a second winding coupled to the output line, a plurality of switches coupled to the input line, and a rectifier configured to be coupled between the second winding of the voltage transformer and the output line; and a second stage configured to receive a voltage error signal and to generate a plurality of pulse width modulation (PWM) signals based on the voltage error signal, the plurality of PWM signals being used to control the plurality of switches in the first stage.

15. The system of claim 14, wherein the second winding of the voltage transformer has a first end connected to the rectifier and a second end coupled to the rectifier with a current transformer coupled between the second end and the rectifier, the output of the rectifier being configured to be coupled to the load.

16. The system of claim 15, wherein the current transformer has a first winding coupled to the second end of the voltage transformer and a second winding, the second winding having a first end that corresponds to a second current feedback signal and a second end that corresponds to a fourth current feedback signal.

17. The system of claim 14, further comprising:

a fourth stage configured to receive the output signal and to generate a first voltage error signal; and a third stage configured to receive the first voltage error signal and to generate a second voltage error signal and a third voltage error signal based on the first voltage error signal, wherein the voltage error signal received by the second stage includes the second voltage error signal and the third voltage error signal generated by the third stage.

18. The system of claim 17, wherein the second stage further includes:

a first comparator configured to compare the second voltage error signal with a first ramp signal and to output results of the comparison as a signal PWM A;

a second comparator configured to compare the second voltage error signal with a second ramp signal and to output results of the comparison as a signal PWM B;

a third comparator configured to compare the third voltage error signal with a third ramp signal and to output results of the comparison as a signal PWM C; and a fourth comparator configured to compare the third voltage error signal with a fourth ramp signal and to output results of the comparison as a signal PWM D.

19. The system of claim 17, wherein the third stage is further configured to receive a first current feedback signal corresponding to a current value of the first switch and a third current feedback signal corresponding to a current value of the third switch, wherein the second voltage error signal is based on a comparison of the first voltage error signal and the first current feedback signal, and wherein the third voltage error signal is based on a comparison of the first voltage error signal and the third current feedback signal.

20. A system, comprising:

a first stage configured to function as at least one of a buck topology, a boost topology, or a combination of the buck topology and the boost topology, the first stage having:

an input side configured to be coupled to an input signal and having a plurality of switches, an output side configured to be coupled to a load and to apply an output signal to the load, a voltage transformer having a first winding coupled to the input side and a second winding coupled to the output side, and a rectifier configured to be coupled between the second winding of the voltage transformer and the load;

a fourth stage configured to receive the output signal and to generate a first voltage error signal;

a third stage configured to receive the first voltage error signal and to generate a second voltage error signal and a third voltage error signal based on the first voltage error signal; and a second stage configured to receive the second voltage error signal and the third voltage error signal and to generate a plurality of pulse width modulation (PWM) signals based on the second voltage error signal and the third voltage error signal, the plurality of PWM signals being used to control the plurality of switches in the first stage, wherein at least one of:

the input signal is configured to be an alternating current (AC) signal, the output signal is configured to be a direct current (DC) signal, and the first stage includes an auxiliary rectifier configured to rectify the AC input signal between the input signal and the plurality of switches; or the input signal is configured to be a direct current (DC) signal, and the output signal is also configured to be a DC signal.

* * * * *